United States Patent

Shimomura

[11] 3,967,100
[45] June 29, 1976

[54] DIGITAL FUNCTION GENERATOR UTILIZING CASCADE ACCUMULATION

[76] Inventor: Naonobu Shimomura, No. 13-8, Sakuragaoka-cho, Shibuya, Tokyo, Japan

[22] Filed: Sept. 13, 1974

[21] Appl. No.: 505,849

[30] Foreign Application Priority Data

| Nov. 12, 1973 | Japan | 48-126899 |
|---|---|---|
| Feb. 1, 1974 | Japan | 49-13470 |
| Feb. 13, 1974 | Japan | 49-17360 |
| Apr. 5, 1974 | Japan | 49-38634 |
| July 23, 1974 | Japan | 49-84298 |

[52] U.S. Cl. ................ 235/152; 235/197
[51] Int. Cl.² .......................... G06F 1/02
[58] Field of Search .......... 235/152, 197, 151.11

[56] References Cited
UNITED STATES PATENTS

| 3,633,017 | 1/1972 | Crooke et al. | 235/197 X |
| 3,789,203 | 1/1974 | Cutherall et al. | 235/152 |
| 3,813,528 | 5/1974 | Blanding | 235/152 |
| 3,813,529 | 5/1974 | Bartlett | 235/152 |

*Primary Examiner*—David H. Malzahn
*Attorney, Agent, or Firm*—Staas & Halsey

[57] ABSTRACT

This invention relates to apparatus for obtaining the numerical value of a function of a single or plural number of variables. The method of cascade accumulation is used in which memories M0, M1, M2, . . . , Mn are involved and under one cycle of manipulation the contents of memories M1, M2, . . . , Mn are added to the contents of M0, M1, M2, . . . , Mn-1 respectively. By loading a digital value determined by $a_0, a_1, a_2, \ldots, a_n$ into each of the memories as its initial value and repeating x cycles of the above mentioned manipulations, the digital value of the function $$w = a_0 + a_1 x + a_2 x^2 + \ldots + a_n x^n \qquad 1.$$

is obtained at the memory M0.

By extending the above principle to two dimensional operations, a digital function of two variables expressed by $$w = a_{00} + a_{10}x_1 + a_{20}x_1^2 + a_{30}x_1^3 + \ldots + a_{00}x_2 + a_{11}x_1x_2 + a_{21}x_1^2x_2 + a_{31}x_1^3x_2 + \ldots + a_{02}x_2^2 + a_{12}x_1x_2^2 + a_{22}x_1^2x_2^2 + a_{32}x_1^3x_2^2 + \ldots + a_{03}x_2^3 + a_{13}x_1x_2^3 + a_{23}x_1^2x_2^3 + a_{33}x_1^3x_2^3 + \ldots + \ldots \qquad 2.$$

is generated.

Further generalizing the cascade accumulation to $n$ dimensions, a digital function of $n$ variables $$w = \Sigma a_{i_1 i_2 \ldots i_j \ldots i_n} x_1^{i_1} x_2^{i_2} \ldots x_j^{i_j} \ldots x_n^{i_n} \qquad 3.$$

is generated.

Since many of the relations of scientific or industrial parameters given by mathematical formulae or numerical tables of empirical data can be expressed with sufficient practical accuracy by polynomials of a power series as shown above, this invention covers a broad field of function generation for practical purposes.

Very simple and reliable electrical circuits to be used for the above operation are disclosed, in one example of which only a shift register, a delay circuit and an adder are involved as the key elements in the logic circuit to generate a multi-variable function, and no complicated programming is needed.

Another type of function generator where $w$ is an independent variable and $x$ is the function of $w$ in equation (1) is also disclosed.

30 Claims, 35 Drawing Figures

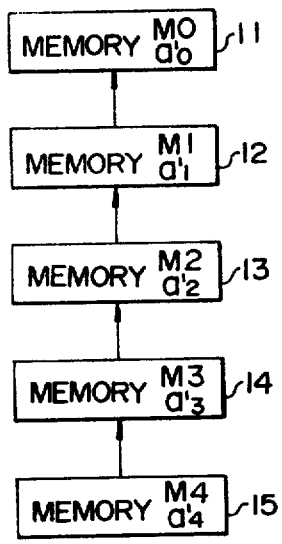
PRIOR ART
FIG. 1
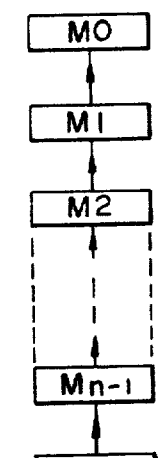
PRIOR ART
FIG. 2
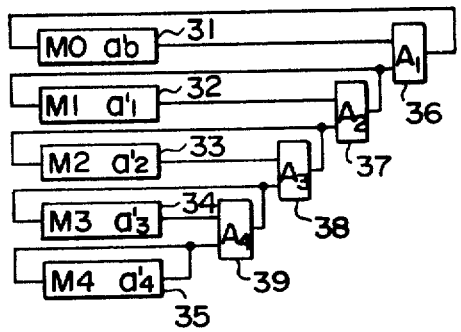
PRIOR ART
FIG. 3
FIG. 4
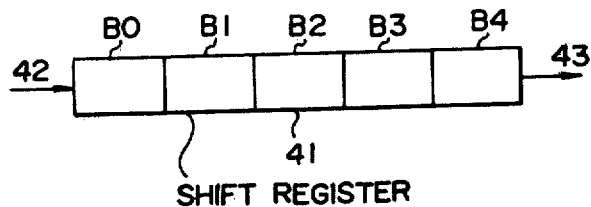
FIG. 5
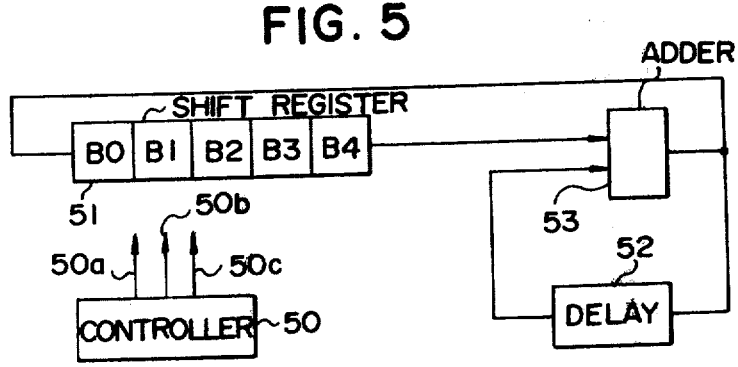

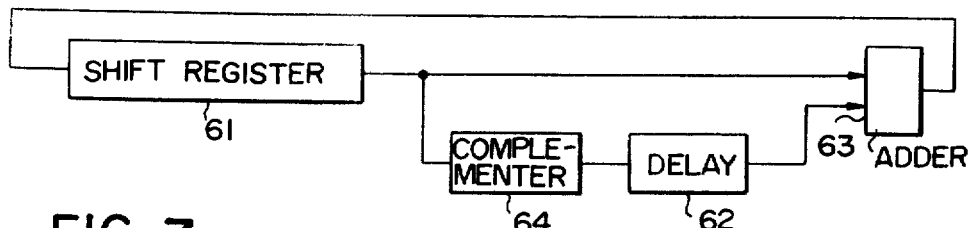
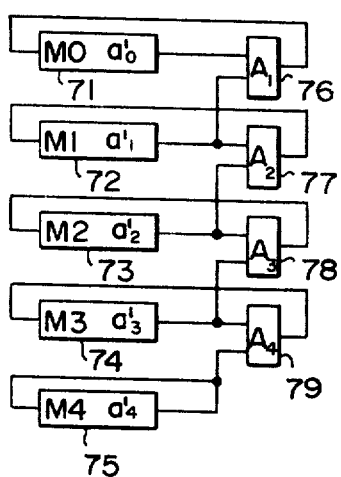
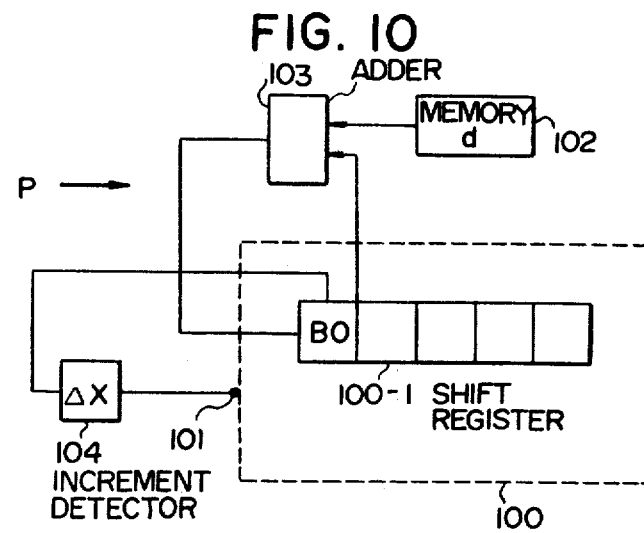
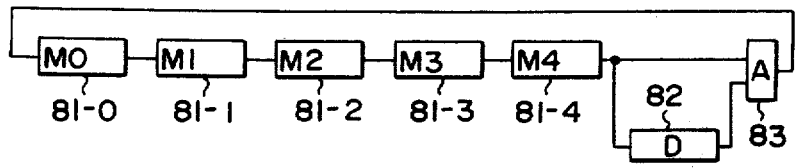
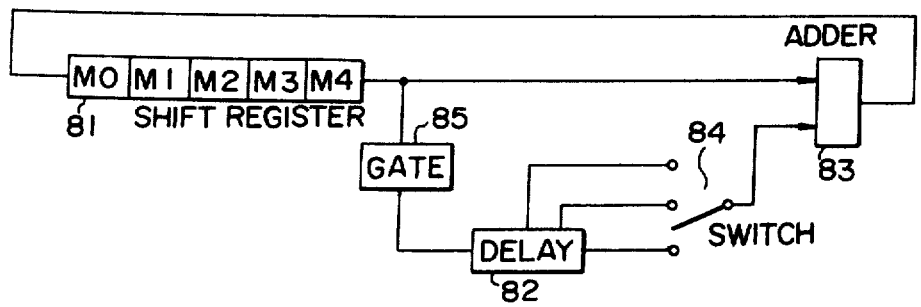

DIGITAL FUNCTION GENERATOR UTILIZING CASCADE ACCUMULATION

BACKGROUND OF THE INVENTION

1. Field of the Invention:

This invention relates to an efficient and simple means to calculate the numerical value of a parameter when the relation between the parameters is given in the form of equation (3) where one of the parameters, ($w$), is expressed as a function of the other parameters $x_1, x_2, \ldots, x_n$.

2. Description of the Prior Art

In many scientific and industrial phenomena there are cases where two or more parameters are related to each other. Those relations between parameters are either expressed by mathematical formulae in some instances or given by numerical tables in other cases. To use such phenomena for a practical purpose, it is of a paramount importance to obtain the value of a parameter in terms of the others.

A function generator of the type of equation (1) comprising a cascade accumulator is described in my patent application filed Apr. 27, 1972, U.S. Ser. No. 248,141, entitled TEMPERATURE MEASURING EQUIPMENT WITH POLYNOMIAL SYNTHESIS, now U.S. Pat. No. 3,843,872. The discussions with regard to the FIGS. 29, 32, 33, 34 and 35, and equations (66) through (76) of the above application shown the principle and operation of the cascade accumulator. But this is limited to a function of a single variable whereas this invention relates further to a function of a plural number of variables and shows other and simplified circuitry for the cascade accumulation even for a function of a single variable.

The U.S. Pat. No. 3,015,444 DIGITAL DATA GENERATOR CIRCUITS FOR COMPUTER TESTING invented by H. A. Schneider shows also a function generator of the type of equation (1). In the Schneider patent, however, each term of the equation (1) is generated separately and then combined to form a polynomial. As a result, the circuitry needed is much more complicated, compared with the present application.

SUMMARY OF THE INVENTION

The Taylor's Theorem in mathematics shows that any function ($w$) of variables $x_1, x_2, \ldots, x_n$ which has definite values of successive partial differential coefficients can be expanded into the power series of its variables as expressed by equation (3). In most practical cases the value of the function can be approximately expressed with adequate practical accuracy by a limited number of terms of equation (3). Still in other cases where the relations of $w$'s and $x_1, x_2, \ldots, x_n$'s are given by numerical tables, the expressions of the form of equation (3) can represent most of such relations, for practical purposes, by proper selection of the coefficients $a_{i_1 i_2 \ldots i_n}$. When the function dependes only on one variable as expressed by equation (1), the art of curve fitting is adopted to determine the values of coefficients $a$'s, and by properly dividing the ranges of the variable into several parts, the function can be expressed in each part by an equation having lower power terms of the variable, again with sufficient accuracy for practical purposes. This technique also can be applied to a function of a plural number of variables.

Once a function ($w$) is expressed in terms of its variables $x_1, x_2, \ldots, x_n$ as shown by equation (3), the value of ($w$) is calculated very simply and cleverly by means of a multi-dimensional cascade accumulation of the present invention.

The multi-dimensional cascade accumulator comprises memory means of a multi-dimensional addresses $(i_1, i_2, \ldots, i_j, \ldots, i_n)$, where $n \geq 2$, and $i_j = 0, 1, 2, \ldots, m_j$, and at least one of $m_j$'s $\geq 2$, each having a word length sufficient to accommodate loading of a numerical value determined by the coefficients $a_{i_1 i_2 \ldots i_j \ldots i_n}$'s as its initial value, manipulating means for algebraic additions of the contents of addresses $(i_1, i_2, \ldots, i_{j-1}, i_j+1, i_{j+1})$, to the contents of addresses $(i_1, i_2, \ldots, i_{j-1}, i_j, i_{j+1}, \ldots, i_n)$ with respect to every combination of $i_1, i_2, \ldots, i_{j-1}$ and at least $i_{j+1} = 0, i_{j+2} = 0, \ldots, i_n = 0$, and means for cascade accumulation by performing said manipulations a number of times corresponding to the value of variable $x_j$. The abovementioned cascade accumulation is realized by very simple and efficient circuits in the present invention where the interconnecting relationships between the memories and adders concerned are kept unchanged during one manipulation and do not need any complicated program and controls, as in the case of a general purpose computer, to produce a complex function.

Because of the versatility and the simplicity of the function generator of the present invention, a variety of applications in broad fields are expected.

Consider, for example, a flow measurement. Gaseous flow Q depends on the temperature T which, in turn, is represented by the output V of a non-linear sensor. According to the present invention, Q is directly calculated in terms of V eliminating the intermediate parameter T.

As an application of the present invention, certain types of complex simultaneous equations containing real time sensor outputs can be solved. An example is shown later with respect to FIG. 24.

Therefore, the object of this invention is to obtain the numerical value of a parameter which depends on one or more parameters, directly or indirectly. The fields of application of this invention are unlimited; anywhere that such an evaluation of a function is needed, this invention can be utilized.

This invention is utilizable in a broad field including scientific, industrial and military applications where such calculations are required. Such applications include a measurement where the quantity to be measured is determined by a non-linear sensor output, or where the quantity to be measured depends on two or more sensor outputs, or where it is desired to obtain a control signal for a system in digital form in response to a set of observed, i.e., measured, values.

BRIEF DESCRIPTION OF THE DRAWINGS:

FIG. 1 shows the principle of cascade accumulation for generating a fourth power polynomial, as used in this invention.

FIG. 2 shows the principle of cascade accumulation for generating an nth power polynomial, as used in this invention.

FIG. 3 shows an example of a cascade accumulator of the prior art.

FIG. 4 shows a shift register for use in a cascade accumulator in accordance with this invention.

FIG. 5 shows an embodiment of a function generator of type A employing the first kind of cascade accumulator in accordance with this invention.

FIG. 6 shows an embodiment of a function generator complementary to that of FIG. 5.

FIG. 7 shows an embodiment of a function generator of type A and employing a second kind of cascade accumulator in accordance with this invention.

FIG. 8 shows another embodiment of a function generator of type A and employing a second kind of cascade accumulator in accordance with this invention.

FIG. 8A shows another embodiment of a function generator wherein the lengths of memories are not equal.

FIG. 10 shows an embodiment of a function generator of type B and employing a cascade accumulator in accordance with this invention.

DETAILED DESCRIPTION OF THE INVENTION

Figure 9:
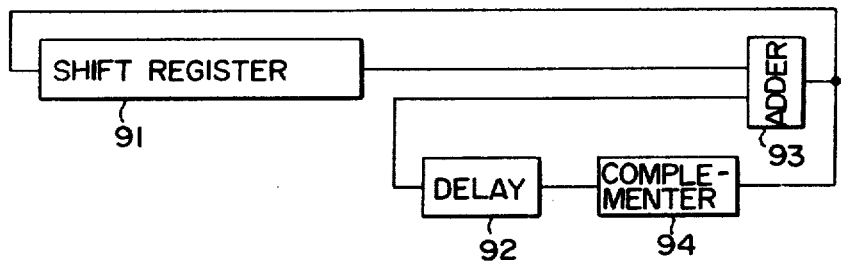
FIG. 9 shows an embodiment of a function generator complementary to that of FIG. 8.

An example of cascade accumulation for producing a polynomial function is shown in my patent application U.S. Ser. No. 248,141 filed Apr. 27, 1972 now U.S. Pat. No. 3,843,872. FIG. 1 shows its principle in which five memories, each of a full word length, and addressed respectively by M0, M1, M2, M3, M4 are arranged in five stages. Cascade accumulation is performed by adding the content of M4 to M3 and the resulting summation content of M3 is in turn added to M2 and so on up to M0. Initial values, $a_0'$, $a_1'$, $a_2'$, $a_3'$, $a_4'$ are loaded in the memories M0, M1, M2, M3, M4 respectively, where:

$$a_0' = a_0 \quad\quad\quad 4.$$

$$a_1' = a_1 - a_2 + a_3 - a_4 \quad\quad\quad 5.$$

$$a_2' = 2a_2 - 6a_3 + 14a_4 \quad\quad\quad 6.$$

$$a_3' = 6a_3 - 36a_4 \quad\quad\quad 7.$$

$$a_4' = 24a_4 \quad\quad\quad 8.$$

By repeating the cascade accumulations $x$ times, the value ($w$) expressed by the following equation (9) is obtained in the memory M0:

$$w = a_0 + a_1x + a_2x^2 + a_3x^3 + a_4x^4 \quad\quad\quad 9.$$

It is understood that by means of generalizing the arrangement of FIG. 1 to the arrangement of FIG. 2 and loading each of the memories M0, M1, M2, . . . with numerical values determined by $a_0$, $a_1$, $a_2$, . . . , and repeating cascade accumulations $x$ times, the value of ($w$) expressed by the equation (1) is obtained at the memory M0. The above-described cascade accumulation, where the content of memory $Mi + 1$, comprising a summation value resulting from addition thereto of the content of the lower stage memory $Mi + 2$, is added to the higher stage memory $Mi$, is hereafter called the first kind of cascade accumulation. A second kind of cascade accumulation is shown later in which the content of memory $Mi + 1$, before having added thereto the content of the lower stage memory Mi + 2, is added to the higher stage memory Mi. In either the first kind or the second kind of cascade accumulation, a cascade accumulator in accordance with the present invention comprises $n + 1$ stages of memories arranged in cascade, wherein the content of the lower stage memory Mi + 1 is added to the content of the next higher stage memory Mi to generate a nth power polynomial function. In such cascade accumulations, the contribution of the content of a lower stage memory Mq to an upper stage memory Mj is dependent on the difference of the addresses $(q - j)$ and the number of times of cascade accumulating operations. Thus, when the initial value of memory Mq is $a'q$, and $y$ times of cascade accumulations are manipulated, the contribution of the content of Mq to the content of Mj is expressed by a function:

$$a_q' \cdot \phi(q - j, y) \qquad 10.$$

FIG. 3 shows an embodiment appearing in the above mentioned U.S. Pat. No. 3,843,872 for generating a fourth power polynomial function, in which $A_1$, $A_2$, $A_3$, $A_4$ are adders. The memories M0, M1, M2, M3, M4 are read out simultaneously, and the read out digits from memory Mi are applied to one of the inputs of the adder $A_{i+1}$ and the output of the lower stage adder is applied to the other input of that same adder. The memory Mi thus is rewritten by the output of the adder $A_{i+1}$ except for the lowest stage memory M4 which is read non-destructively, and applied to the other input of the adder $A_4$.

FIG. 4 shows an example of a shift register to be used in some of the embodiments of the present invention. The register 41 is divided into blocks B0, B1, B2, B3 and B4, and shifted to right and read out as shown by the arrow 43, B4 first and B0 last. The direction of writing into the shift register is as shown by the arrow 42.

FIG. 5 shows an embodiment of the present invention wherein the shift register of FIG. 4 is used for cascade accumulation. The circuit includes shift register 51, which may be the same as that of FIG. 4, a delay circuit 52, and an adder 53. The digits read out from the register 51 are led to one of the inputs of the adder 53 and the output of the adder 53 is led to the other input of the adder 53 through the delay circuit 52 and also rewritten in the register 51. The amount of delay of the delay circuit 52 is selected to be equal to the length, i.e., time storage interval, of each block, i.e., stage of the register 51; the blocks B0, B1, B2, B3, B4 represent the memories M0, M1, M2, M3, M4, respectively, of FIG. 1. One cascade accumulation of the first kind is performed by one cycle of shifting of the register 51, and the function of equation (9) is obtained in the block B0 by shifting the register $x$ cycles. Controller 50 produces shift pulses at its output 50a, control signals at the output 50b which inhibit the last word of each cycle of the adder output from entering into the delay circuit 52, or clear the word digits remaining in the delay circuit 52, when each cycle of shifting is completed, and carry inhibit signals at the output 50c which inhibit the carry generated by the sign bits in the adder 53 from entering into the next stage when, for example, a digital value is represented by a binary code and a sign bit. One of the features of this embodiment is that the interconnecting relationship between the register 51 and the adder 53 is held unchanged during one cycle of cascade accumulation, and complex controls or programs to perform the cascade accumulation as in the case of a general purpose computer are not needed. This is true for any embodiments of this invention as shown later. The above explanation relates to a cascade accumulator for generating a function as expressed by the equation (9) when $x$ is increasing. To construct a cascade accumulator of the first kind for decreasing $x$, it is necessary that the content of the memory Mi + 1, before being subtracted by the content of Mi + 2, be subtracted from the content of the upper stage memory Mi, so that the content of any one of the memories is unchanged either for increasing $x$ or decreasing $x$. FIG. 6 shows a circuit for decreasing $x$, and thus is complementary to the circuit of FIG. 5 for increasing $x$. In FIG. 6, the output of the shift register 61, as shifted, is led to one of the inputs of the adder 63 directly, and through complementer 64 and delay circuit 62 to the other input of the adder 63. The output of the adder 63 then is rewritten in the register 61. Although not shown in FIG. 6, a controller which corresponds to the controller 50 in FIG. 5 is employed.

From the above description it is understood that the operation of a complementary mode of a cascade accumulator for equation (9), after $x$ has attained its maximum value $x_1$ and now proceeds to decrease to its smaller value $x_2$, is identical to the operation of a new cascade accumulator, which has the same circuit construction as the above complementary mode of cascade accumulator, but having a new variable $(x_1 - x_2)$, and newly starts at $x_1 - x_2 = 0$, with the initial values for the memories being the same as those obtained at $x = x_1$ in the memories by the original, non-complementary mode, cascade accumulator. Namely, the initial conditions for the contents of memories for the new cascade accumulator, complementary mode, are automatically loaded as a result of the operation of the original cascade accumulator at the point $x = x_1$.

Figure 29:
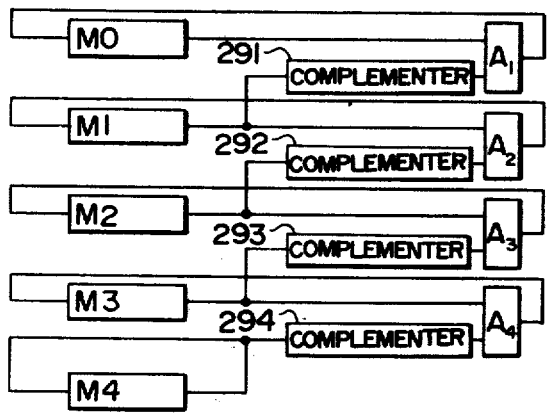
FIG. 29 shows a cascade accumulator complementary to that of FIG. 3.

A cascade accumulator of the first kind for decreasing $x$, and which is complementary to the circuit of FIG. 3, is shown in FIG. 29. The digits read out from the memories M0, M1, M2 and M3 are applied to first inputs of the adders $A_1$, $A_2$, $A_3$ and $A_4$, respectively, and the digits read out from the corresponding lower stage memory are led through respective complementers 291 to 294 to the other, second, inputs of the adders $A_1$ to $A_4$, respectively. The outputs of the adders $A_1$, $A_2$, $A_3$ and $A_4$ then are rewritten into the memories M0, M1, M2, and M3, respectively. The memory M4 is read non-destructively. These complementary cascade accumulators are used for decreasing $x$, to the extent where the equations (9) or (1) hold even for the negative values of $x$, and this also is true for the second kind of cascade accumulator which is explained later.

A cascade accumulator for negative values of the variable $x$ may be constructed instead by a non-complementary circuit, as represented by FIG. 3 or FIG. 5 for the first kind of accumulator, by changing the sign of the coefficients of odd power terms of $x$ in the equation (1) and changing the initial value given to each of the memories accordingly.

The complementary mode of a cascade accumulator described above is useful to generate a function which has certain symmetry. For example, the cosine function of a variable $x$ may be represented by a fourth power polynomial of $x$ as follows:

$$y = 1 - 0.496 x^2 + 0.036766 x^4 \qquad 11.$$

with an error of less than 0.001 between the range $-\pi/2 \leq x \leq \pi/2$; however, the error becomes conspicuous as the value of $x$ exceeds the range, typically $y = 8.116$ while $\cos x = 0$ at $x = 3\pi/2$.

Figure 28:
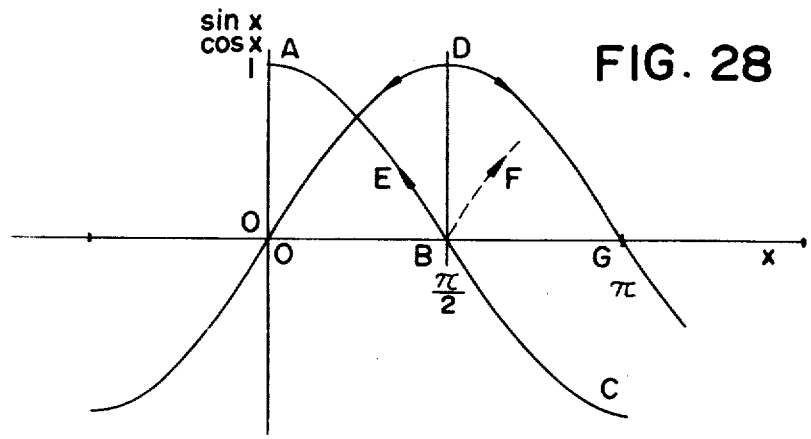
FIG. 28 is a graph for explaining the generation of sine and cosine function in accordance with a particular application of this invention.

In FIG. 28, the curve AB shows a curve generated by a cascade accumulator constructed to generate the function (11) and accurately represents $\cos x$ for $x \leq \pi/2$. If we switch the cascade accumulator to its complementary mode at $x = \pi/2$, and thereafter count every change of $x$ as being in the decreasing, backward direction of $x$ axis, the curve shown by the arrow E is generated; however, if we continue to count the change of $x$ for the increasing, or forward, direction of the $x$ axis with the complementary mode, the curve shown by the arrow F which is symmetrical to E is generated. So, by changing the sign of the value obtained in the uppermost stage of memories of the cascade accumulator, the curve shown by BC is generated which represents the value of $\cos x$ up to $x = 3\pi/2$ with the same accuracy as in the range AB. Also by starting the count of $x$ at $x = \pi/2$ with the above complementary mode of cascade accumulation, a function representing $\sin x$ shown by the curve ODG is generated.

the value ($w$) expressed by the equation (9) is obtained in the memory M0.

It is noted that by means of cascade accumulators, either of the first kind or the second kind, the same type of function is generated. As a result, the second kind of accumulators of any version which are to be explained below can be used to perform the same functions as those of the first kind of cascade accumulators, explained above.

FIG. 7 shows an embodiment of the cascade accumulator of the second kind, where M0, M1, M2, M3, M4 are memories and are loaded respectively with $a_0'$, $a_1'$, $a_2'$, $a_3'$, $a_4'$ as their initial values, as given by the equations (13), (14), (15), (16), (17), respectively. $A_1$, $A_2$, $A_3$, $A_4$ are adders. The digits read out from the first four memories are applied to the first input of the corresponding adders, and the digits read out from the next lower stage memories are applied to the other inputs of the adders, respectively. The output of each adder is rewritten in the corresponding memory. The lowest stage memory is non-destructively read. It is obvious that by shifting all the memories simultaneously, one cascade accumulation of the second kind is performed.

TABLE

| x | M0 | M1 | M2 | M3 | M4 |
|---|---|---|---|---|---|
| 0 | $a_0'$ | $a_1'$ | $a_2'$ | $a_3'$ | $a_4'$ |
| 1 | $a_0' + a_1'$ | $a_1' + a_2'$ | $a_2' + a_3'$ | $a_3' + a_4'$ | $a_4'$ |
| 2 | $a_0' + 2a_1' + a_2'$ | $a_1' + 2a_2' + a_3'$ | $a_2' + 2a_3' + a_4'$ | $a_3' + 2a_4'$ | $a_4'$ |
| 3 | $a_0' + 3a_1' + 3a_2' + a_3'$ | $a_1' + 3a_2' + 3a_3' + a_4'$ | $a_2' + 3a_3' + 3a_4'$ | $a_3' + 3a_4$ | |
| 4 | $a_0' + 4a_1' + 6a_2' + 4a_3' + a_4'$ | $a_1' + 4a_2' + 6a_3' + 4a_4'$ | $a_2' + 4a_3' + 6a_4'$ | $a_3' + 4a_4'$ | $a_4'$ |
| 5 | $a_0' + 5a_1' + 10a_2' + 10a_3' + 5a_4'$ | $a_1' + 5a_2' + 10a_3' + 10a_4'$ | $a_2' + 5a_3' + 10a_4'$ | $a_3' + 5a_4'$ | $a_4'$ |
| 6 | $a_0' + 6a_1' + 15a_2' + 20a_3' + 15a_4'$ | $a_1'' \, 6a_2' + 15a_3' + 20a_4'$ | $a_2' + 6a_3' + 6a_3' + 15a_4'$ | $a_3' + 6a_4'$ | $a_4'$ |

It is noted that in the equation (11), ($x$) is expressed in radians; however, for practical purposes, an appropriate scale factor is used so that for every increment of $x$, the quantized step is small enough.

Next, the cascade accumulators of the second kind are explained, in which, referring to FIG. 2, by one cascade accumulating operation, the content of the memory Mi + 1, before having the content of the lower stage memory Mi + 2 added thereto, instead is added to the content of the upper stage memory Mi. Referring to FIG. 1, where memories M0, M1, M2, M3, M4 are loaded with initial values $a_0'$, $a_1'$, $a_2'$, $a_3'$, $a_4'$, respectively, and the above mentioned cascade accumulation of the second kind is repeated, then, the contents of the memories will be as shown in the following TABLE. In the TABLE, $x$ represents the number of times of cascade accumulations and the columns marked by M0, M1, M2, M3, M4 show the contents of those memories corresponding to $x$. The content of M0, after $x$ times of cascade accumulations, is expressed by:

$$a_0' + (a_1' - \tfrac{1}{2}a_2' + \tfrac{1}{3}a_3' - \tfrac{1}{4}a_4')x + (\tfrac{1}{2}a_2' - \tfrac{1}{2}a_3' + 11/24a_4')x^2 + (1/6a_3' - \tfrac{1}{4}a_4')x^3 + 1/24a_4'x^4 \quad 12.$$

Therefore, by setting values as follows:

$$a_0' = a_0 \quad 13.$$

$$a_1' = a_1 + a_2 + a_3 + a_4 \quad 14.$$

$$a_2' = 2a_2 + 6a_3 + 14a_4 \quad 15.$$

$$a_3' = 6a_3 + 36a_4 \quad 16.$$

$$a_4' = 24a_4 \quad 17.$$

FIG. 8 shows another embodiment of the second kind of cascade accumulator. The circuit includes memories M0, M1, M2, M3, M4, which form a shift register as shown in FIG. 4, a delay circuit 82 and an adder 83. It is clear that by selecting the amount of delay of the delay circuits to be equal to the word length of the memory, and by shifting all the memories in series during one cycle, one cascade accumulation of the second kind is performed.

FIG. 8A shows an embodiment of the second kind of cascade accumulator in which the lengths of the memories M0, M1, . . . are not equal. This circuit includes additionally a gate 85 and a switch 84 which select the amount of the delay of a delay circuit 82. By controlling the gate 85 so as to inhibit the insignificant digits of each memory content, which are unnecessary for the next upper stage memory, from entering into the delay circuit 82, and by selecting the amount of delay of the delay circuit 82 by the switch 84 so that digits of the same weight enter both inputs of the adder 83, the cascade accumulations can be performed even when the lengths of the memories are not equal. By this arrangement, the total memory capacity required to perform the same cascade accumulations are minimized. The same method can be used for the first kind of cascade accumulator.

Figure 30:
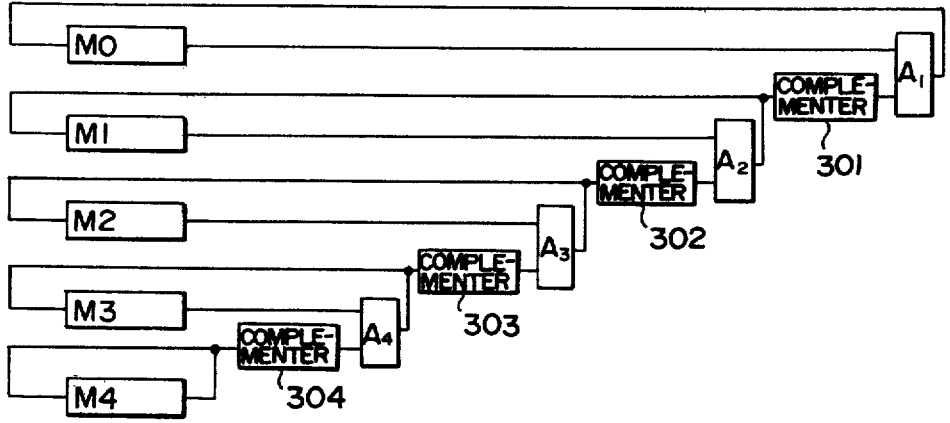
FIG. 30 shows an embodiment of a function generator complementary to that of FIG. 7.

FIG. 30 shows a cascade accumulator complementary to that of FIG. 7, and FIG. 9 shows a cascade accumulator complementary to that of FIG. 8. The general arrangement of the circuit of FIG. 30 is the same as that of FIG. 3 except that a complementer is inserted between one of the inputs of each adder and the output either of the respectively next lower stage adder or the lowest stage memory. Similarly, the arrangement of FIG. 9 is the same as that of FIG. 5 except that a complementer 94 is inserted in series with the delay circuit 92. Also, the general arrangement of FIG. 29, which is a complementary mode of the cascade accumulator of the first kind, is the same as the general arrangement of the second kind of cascade accumulator of FIG. 7 except for the complementers used in FIG. 29. Similarly, the general arrangement of FIG. 6, which is the complementary mode of the first kind of cascade accumulator as shown in FIG. 5, corresponds to that of FIG. 8, which is the second kind of cascade accumulator, except that a complementer 64 is used in FIG. 6.

As described above, the cascade accumulation operations of FIG. 3, FIG. 7, FIG. 29 and FIG. 30 are performed by bit serial word parallel additions, and the cascade accumulation operations of FIG. 5, FIG. 6, FIG. 8, and FIG. 9 are performed by bit serial word serial additions. Although not described as a preferred embodiment, because of the complexity of the circuit, a cascade accumulator constructed by bit parallel additions is also possible, and may be used, particularly where high speed operations are required.

As is clear from the above descriptions, it is quite easy for the skilled in the art to switch the circuit of any version of type A cascade accumulator to its complementary mode or vice versa.

Cascade accumulators described above which generate the function ($w$) given by the equation (1) in which ($x$) is the independent variable are described hereafter as type A cascade accumulators.

There will now be explained another type of function generator, called type B cascade accumulator, which generates a function X expressed by:

$$P = b_1X + b_2X^2 + \ldots b_nX^n \qquad 18.$$

where:
P is the independent variable
$b_1, b_2, \ldots, b_n$ are constants
is explained below.

FIG. 10 shows an embodiment of the type B cascade accumulator. In the figure, the dotted line enclosure 100 represents a type A cascade accumulator. Although any version of the type A cascade accumulator may be used as the cascade accumulator 100, it is depicted with the circuit of FIG. 5 as an example, and the shift register 100-1 and block BO correspond to shift register 51 and BO, respectively of FIG. 5. When any other version of the type A cascade accumulator is used as the dotted line enclosure 100 of FIG. 10, the block BO may be replaced by the memory M0. The type B cascade accumulator of FIG. 10 includes, besides the cascade accumulator 100, a memory 102 which stores a numerical value ($d$), an adder 103, and an increment detector 104. The independent variable P is applied as primary command pulses to the type B cascade accumulator. When one primary command pulse is applied, the block BO of the shift register 100-1 is read out and the memory 102 is non-destructively read out and the two read-out values are algebraically added by the adder 103 and rewritten in the block BO. On the other hand, the increment of the content of the block BO is detected by the increment detector 104 each time a primary command pulse is applied, and secondary command pulses corresponding in number to the detected increment are produced and applied to the type A cascade accumulator 100 and cause the type A cascade accumulator 100 to perform cascade accumulations a number of times corresponding to the number of secondary command pulses. The increment detector 104 may be implemented by the circuit shown at 39 in FIG. 1 and further in FIG. 28 of my U.S. Pat. No. 3,843,872, for increment values 0, 1 or 2; for higher increment values, reference may be had to the Japanese publicaton No. 29334/1973 entitled "Accumulating Apparatus" for disclosure of suitable circuits. Suppose primary command pulses, P in number, are applied; then, because the cascade accumulation of the type A cascade accumulator 100 is performed for each incremental step of the content of the block BO, when it increases monotonically with the increase of P, the cascade accumulations must be performed, eventually, X times in the A type cascade accumulator 100 until the content of the block BO has reached the value X. Thus, the contribution to the content X of block BO from the type A cascade accumulator 100 assuming here that $a_0 = 0$ is:

$$a_1X + a_2X^2 + a_3X^3 + a_4X^4 \qquad 19.$$

On the other hand, when P additions of the content ($d$) of the memory 102 to the block BO have occurred, the contribution to the content X of the block BO from the memory 102 is $$dP \qquad 20.$$

The content X of the block BO, after P primary command pulses are applied, then is the sum of the contributions of both equations (19) and (20), and therefore it may be written that:

$$X = dP + a_1X + a_2X^2 + a_3X^3 + a_4X^4 \qquad 21.$$

Accordingly, by substituting:

$$a_1 = 1 - b_1d \qquad 22.$$
$$a_2 = - b_2d \qquad 23.$$
$$a_3 = - b_3d \qquad 24.$$
$$a_4 = - b_4d \qquad 25.$$

there is derived the value of the function X given by the equation:

$$P = b_1X + b_2X^2 + b_3X^3 + b_4X^4 \qquad 26.$$

in the block BO, provided that X increases with the increase of P. It is understood that by using an appropriate number of stages of memories in the type A cascade accumulator 100, the function X of equation (18) is generated. In the type B cascade accumulator, the value of the function X is also obtained by means of counting the secondary command pulses appearing at the output of the increment detector 104.

Next, generation of a function of two variables is explained below. A function Z of two independent variables $x$ and $y$ can be expanded with respect to $x$ in the form $$Z = f(x,y) = a_0 + a_1x + a_2x^2 + a_3x^3 + a_4x^4 \qquad 27.$$

where the coefficients $a$'s are functions of $y$ and can be expanded as follows:

$$a_0 = a_{00} + a_{01}y + a_{02}y^2 + a_{03}y^3 + a_{04}y^4 \quad (28)$$

$$a_1 = a_{10} + a_{11}y + a_{12}y^2 + a_{13}y^3 + a_{14}y^4 \quad (29)$$

$$a_2 = a_{20} + a_{21}y + a_{22}y^2 + a_{23}y^3 + a_{24}y^4 \quad (30)$$

$$a_3 = a_{30} + a_{31}y + a_{32}y^2 + a_{33}y^3 + a_{34}y^4 \quad (31)$$

$$a_4 = a_{40} + a_{41}y + a_{42}y^2 + a_{43}y^3 + a_{44}y^4 \quad (32)$$

where the coefficients $a$'s of equations (28) through (32) are constants. So, the value of each of the coefficients $a_0, a_1, a_2, a_3, a_4$ of equation (27) can be obtained by a type A cascade accumulator constructed to represent each of the equations (28), (29), (30), (31), (32), respectively. By using another type A cascade accumulator which represents the equation (27) utilizing the values of $a_0, a_1, a_2, a_3$ and $a_4$ obtained above, the value of the function Z of equation (27) is obtained. But this process is rather cumbersome because for the cascade accumulator to represent the equation (27), the initial values of $a_0', a_1', a_2', A_3'$ and $a_4'$ must be loaded into the memories, the values of which are determined by the equations (4) through (8) for the first kind of cascade accumulator and by the equations (13) through (17) for the second kind of cascade accumulator.

Figure 11:
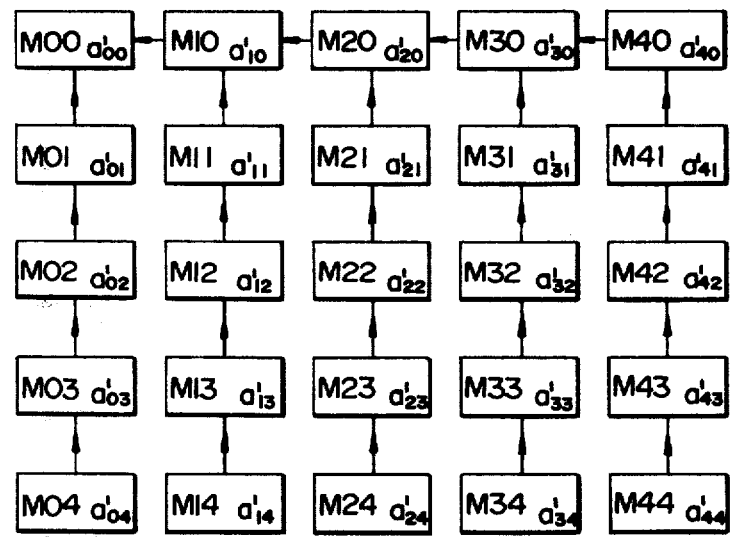
FIG. 11 shows the principle of two dimensional cascade accumulation for generating a function of two variables in accordance with this invention.

FIG. 11 shows an arrangement of memories for the generation of the function $f(x,y)$ by a more integrated method than the above process. In the figure, the memories Mij ($i = 0, 1, \ldots, 4, j = 0, 1, \ldots, 4$) are arranged in a 5 × 5 matrix, and each of the vertical stages M00, M01, M02, M03, M04, or M10, M11, M12, M13, M14, or ... constitutes a type A cascade accumulator of the first or second kind, and the horizontal stages M00, M10, M20, M30, M40 constitute a type A cascade accumulator of the first or second kind. Initial values are loaded into the memories of the matrix so that the initial values given by the equations (4) through (8) or by equations (13) through (17) to generate the equation (27) for a given value of $y$, are obtained in the memories M00, M10, M20, M30 and M40, respectively, when the cascade accumulation operations are finished along the vertical stages. Under these initial values, therefore, the value of the function $Z = f(x,y)$ is obtained in the memory M00 by manipulating cascade accumulations $y$ times along each of the vertical stages and then $x$ times along the horizontal stages.

When the second kind of cascade accumulators are used for both vertical and horizontal cascade accumulations, the initial values $a_{ij}$'s to be loaded into the memories Mij's are given by the equations:

$$a_{00}' = a_{00} \quad (33)$$

$$a_{01}' = a_{01} + a_{02} + a_{03} + a_{04} \quad (34)$$

$$a_{02}' = 2a_{02} + 6a_{03} + 14a_{04} \quad (35)$$

$$a_{03}' = 6a_{03} + 36a_{04} \quad (36)$$

$$a_{04}' = 24a_{04} \quad (37)$$

$$a_{10}' = a_{10} + a_{20} + a_{30} + a_{40} \quad (38)$$

$$a_{11}' = a_{11} + a_{21} + a_{31} + a_{41} + a_{12} + a_{22} + a_{32} + a_{42} + a_{13} + a_{23} + a_{33} + a_{43} + a_{14} + a_{24} + a_{34} + a_{44} \quad (39)$$

$$a_{12}' = 2(a_{12} + a_{22} + a_{32} + a_{42}) + 6(a_{13} + a_{23} + a_{33} + a_{43}) + 14(a_{14} + a_{24} + a_{34} + a_{44}) \quad (40)$$

$$a_{13}' = 6(a_{13} + a_{23} + a_{33} + a_{43}) + 36(a_{14} + a_{24} + a_{34} + a_{44}) \quad (41)$$

$$a_{14}' = 24(a_{14} + a_{24} + a_{34} + a_{44}) \quad (42)$$

$$a_{20}' = 2a_{20} + 6a_{30} + 14a_{40} \quad (43)$$

$$a_{21}' = 2a_{21} + 6a_{31} + 14a_{41} + 2a_{22} + 6a_{32} + 14a_{42} + 2a_{23} + 6a_{33} + 14a_{43} + 2a_{24} + 6a_{34} + 14a_{44} \quad (44)$$

$$a_{22}' = 2(2a_{22} + 6a_{32} + 14a_{42}) + 6(2a_{23} + 6a_{33} + 14a_{43}) + 14(12a_{24} + 6a_{34} + 14a_{44}) \quad (45)$$

$$a_{23}' = 6(2a_{24} + 6a_{33} + 14a_{43}) + 36(2a_{24} + 6a_{34} + 14a_{44}) \quad (46)$$

$$a_{24}' = 24(2a_{24} + 6a_{34} + 14a_{44}) \quad (47)$$

$$a_{30}' = 6a_{30} + 36a_{40} \quad (48)$$

$$a_{31}' = 6a_{31} + 36a_{41} + 6a_{32} + 36a_{42} + 6a_{33} + 36a_{43} + 6a_{34} + 36a_{44} \quad (49)$$

$$a_{32}' = 2(6a_{32} + 36a_{42}) + 6(6a_{33} + 36a_{43}) + 14(6a_{34} + 36a_{44}) \quad (50)$$

$$a_{33}' = 6(6a_{33} + 36a_{43}) + 36(6a_{34} + 36a_{44}) \quad (51)$$

$$a_{34}' = 24(6a_{34} + 36a_{44}) \quad (52)$$

$$a_{40}' = 24a_{40} \quad (53)$$

$$a_{41}' = 24a_{41} + 24a_{42} + 24a_{43} + 24a_{44} \quad (54)$$

$$a_{42}' = 2 \times 24a_{42} + 6 \times 24a_{43} + 14 \times 24a_{44} \quad (55)$$

$$a_{43}' = 6 \times 24a_{43} + 36 \times 24a_{44} \quad (56)$$

$$a_{44}' = 24 \times 24a_{44} \quad (57)$$

With the above initial values established in the memories, the accumulated values at the memories M00, M10, M20, M30 and M40 as a result of $y$ times of cascade accumulations along the corresponding vertical stages of memories can be used intact as the initial values for the second kind of cascade accumulations along the horizontal stages of memories M00, M10, M20, M30 and M40.

The above initial values to be loaded in the memories are those for the second kind of cascade accumulations, for both vertical and horizontal stages. It is obvious that the first kind of cascade accumulators can be also used for any one or more of the vertical or horizontal cascade accumulators, provided the initial values to be loaded into the corresponding memories are changed accordingly.

Figure 12:
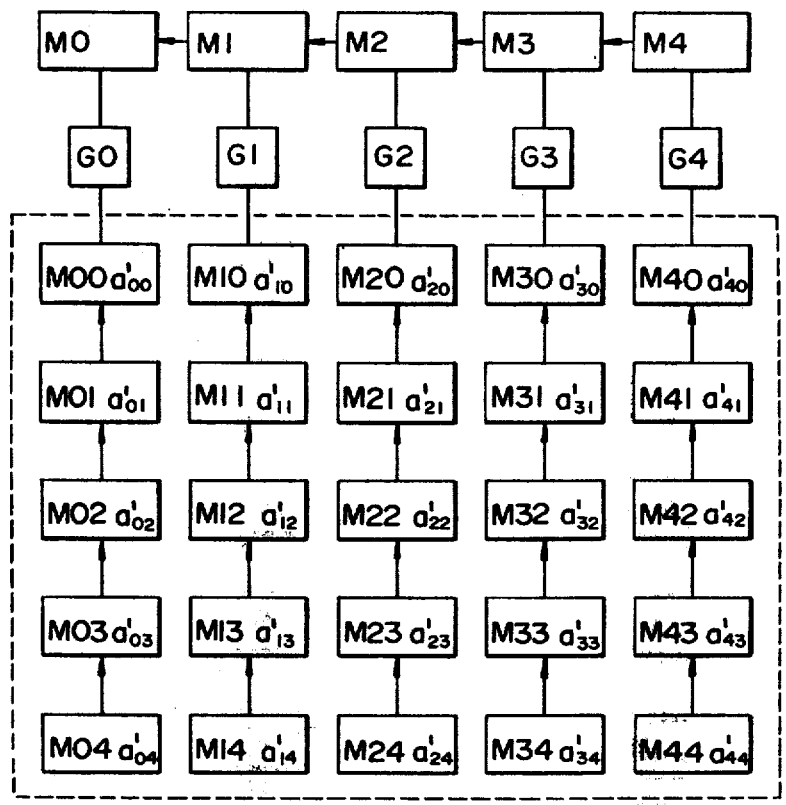
FIG. 12 shows the principle of two dimensional cascade accumulation for generating a function of two variables which change in real time, in accordance with this invention.

FIG. 12 shows another embodiment of this invention where $x$ and $y$ vary in real time. In the FIGURE, the memories are arranged in the dotted line enclosure similarly to those of FIG. 11, but the cascade accumulations are performed only along the vertical stages with respect to $y$. The accumulated values at the memories M00, M10, M20, M30 and M40 are non-destructively read into the memories M10, M1, M2, M3 and M4, respectively, through the gates G0, G1, G2, G3 and G4. When the value of $y$ changes from $y$ to $Y + 1$ one cascade accumulation is performed along each of the vertical memory stages in the dotted enclosure, and after the accumulated values of M00, M10, M20, M30 and M40 have been read into corresponding memories M0, M1, M2, M3 and M4, the cascade accumulations along these horizontal stages of memories are performed corresponding to the value of $x$. Thus, the time required to generate the function $f(x,y)$ for varying variables is greatly reduced.

It is clear that the cascade accumulations for any of the stages of memories, whether vertical or horizontal, as shown in FIG. 11 or FIG. 12 can be carried out by the circuits shown in FIGS. 3, 5, 6, 7, 8, 9, 29 or 30.

In the above embodiment, a cascade accumulator is needed for each of the stages of memories. In contrast to the above embodiment, FIG. 14 through FIG. 17 show other versions of the function generator of this invention where two dimensional cascade accumulations are carried out by a single cascade accumulator. Hereafter, explanations are made with respect to a function $f(x,y)$ expressed by a polynomial containing up to the second power of $x$ and $y$, for the sake of simplicity and not in a limiting sense.

Figure 13:
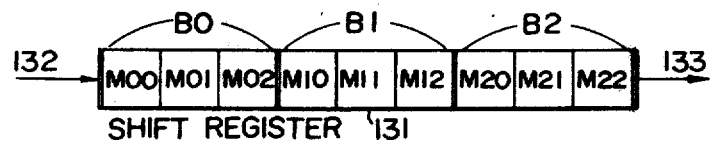
FIG. 13 shows a shift register for use in a two dimensional cascade accumulator in accordance with this invention.

FIG. 13 shows a shift register to be used for a two dimensional cascade accumulation. For a second power polynomial, the shift register 131 is divided into three blocks B0, B1, and B2, and in the block B0 three memories of word length M00, M01 and M02 are located; likewise, memories M10, M11 and M12 are located in the block B1 and memories M20, M21 and M22 are located in the block B2. The shift register 131 is shifted and read out as shown by the arrow 133 in the order of the memory M22 of block B2 first and the memory M00 of the block B0 last, and written into as shown by the arrow 132 in the same order.

Figure 14:
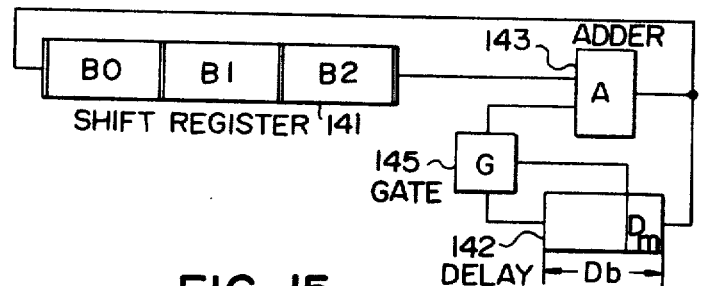
FIG. 14 shows an embodiment of a function generator for a function having plural number of variables in accordance with this invention.

FIG. 14 shows an embodiment of a two dimensional cascade accumulator including a shift register 141 which may be as shown at 131 in FIG. 13, a delay circuit 142 in which the delay Db equals the block length of the register 141, and Dm is a delay equal to the length of a memory in the block of the register 141, an adder 143 and a gate circuit 145 which selects either the delay length Db or Dm of the delay circuit 142. The shift register 141 is shifted and the output applied to one of the inputs of the adder 143. The output of the adder 143 is applied through either delay Db or the delay Dm, depending on the selection by the gate circuit 145, to the other input of the adder 143 and also is rewritten into the register 141. It is now obvious that by shifting the shift register one cycle, one cascade accumulation is performed in each of the stages of memories M20, M21, M22; M10, M11, M12 and M00, M01, M02 when the delay Dm of the delay circuit 142 is selected, which corresponds to the cascade accumulation of vertical stages of memories in FIG. 11, and also one cascade accumulation is performed in each of the stages of memories M02, M12, M22; M01, M11, M21 and M00, M10, M20 when the delay Db of the delay circuit 142 is selected, which corresponds to the cascade accumulation of horizontal stages of memories in FIG. 11. However, in FIG. 11, the horizontal cascade accumulation is performed only for the stages of the memories M00, M10, M20. This is an extension of the first kind of cascade accumulation of type A, explained with reference to FIG. 5, to two dimensional operation. Although not appearing in FIG. 14, there are further provided a source of shift pulses, and a source of signals for inhibiting the information of the uppermost stages of the memories from entering into the delay circuit, and signals inhibiting the generation of carries from the sign bits in the adder, as in the case of FIG. 5.

Figure 15:
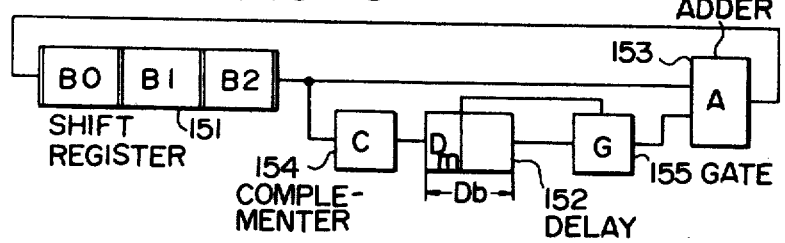
FIG. 15 shows an embodiment of a function generator complementary to that of FIG. 14.

FIG. 15 shows an embodiment of the complementary mode of the two dimensional cascade accumulator of FIG. 14. In FIG. 15, the circuit includes a shift register 151 which may be as shown in FIG. 13, a delay circuit 152 in which delay Db corresponds to the block length of the register 151, and delay Dm corresponds to the memory length of the register 151, an adder 153, a gate circuit 155 which selects delay Db or delay Dm of the delay circuit 152, and a complementer 154. The shift register 151 is shifted and the output is applied to one of the inputs of the adder 153, and through complementor 154 and the delay Db or Dm of delay circuit 152, depending on the selection by the gate circuit 155, to the other input of the adder 153. The output of the adder 153 is rewritten in the shift register 151. From the above description, it is clear that FIG. 15 is the extension of the complementary mode of the first kind of cascade accumulator of type A, as shown in FIG. 6, to two dimensional operation; by the selection of either delay Dm or delay Db in the delay circuit 152 and by shifting the shift register for one cycle, the cascade accumulations either of the vertical or of the horizontal stages of the memories of FIG. 11 are performed in the decreasing direction of the respective variables.

Figure 16:
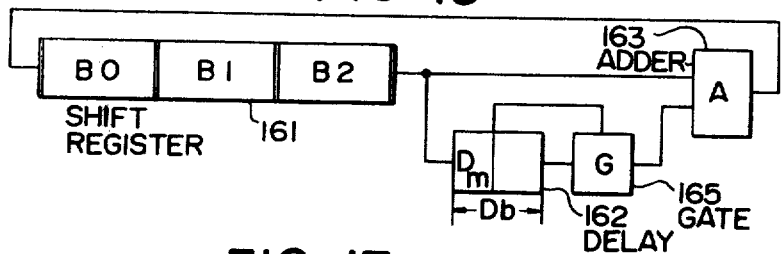
FIG. 16 shows another embodiment of a function generator for a function having a plural number of variables, in accordance with this invention.

FIG. 16 shows an embodiment of another two dimensional cascade accumulator, including a shift register 161, which may be of the type of FIG. 13, a delay circuit 162 wherein delay Db corresponds to the block length and delay Dm corresponds to the memory length of the register 161 and a gate circuit 165 for selecting one of the delays Dm and Db, and an adder 163. The shift register 161 is shifted and the output is applied to one of the inputs of the adder 163, and through delay circuit 162 having delay Db or Dm, as selected by the gate circuit 165, to the other input of the adder 163; the output of the adder 163 is rewritten into the shift register 161. It is again obvious that this is an extension of the type A cascade accumulator of the second kind, as shown in FIG. 8, to a two dimensional operation. The function $(x,y)$ is generated by selecting one of the delays Db or Dm and repeating the cycles of shifting of the shift register 161 corresponding to the values of the variables.

Figure 17:
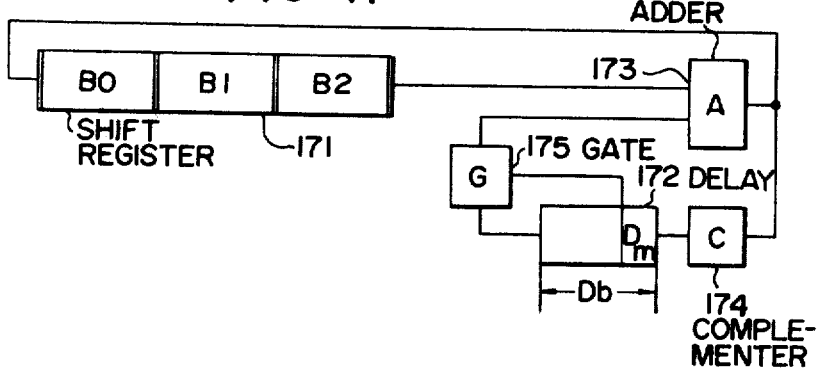
FIG. 17 shows an embodiment of a function generator complementary to that of FIG. 16.

FIG. 17 shows a two dimensional cascade accumulator complementary to that of FIG. 16. In FIG. 17, the circuit includes a shift register 171 which may be of the type of FIG. 13, a delay circuit 172 having a delay Db or Dm, as selected by the gate circuit 175, a complementer 174, and an adder 173. The shift register is shifted and the output applied to one of the inputs of the adder 173, and the output of the adder 173 is applied through the selected one of the delays Db or Dm of the delay circuit 172 and complementer 174 to the other input of the adder 173, and the output of the adder 173 is rewritten into the shift register 171. It is clear that by shifting the shift register a number of cycles, with delay Db or Dm, the cascade accumulations of the second kind in the direction of decreasing $x$ or $y$ are performed, and the function $f(x,y)$ with decreasing variables is generated.

Figure 18:
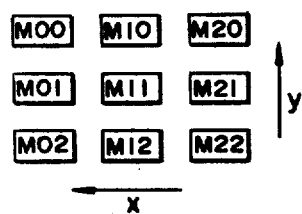
FIG. 18 shows schematically a memory arrangement which serves to facilitate a discussion of a multi-dimensional cascade accumulation in accordance with this invention.

In the embodiments shown by FIG. 14 through FIG. 17 cascade accumulations are performed with respect to all of the vertical and horizontal stages of memories. FIG. 18 affords a better understanding of such operations. When the amount of delay is selected to be Dm in FIG. 14 through FIG. 17, cascade accumulations of all the vertical stages of memories M00, M01, M02; M10, M11, M12 and M20, M21, M22 are performed. These cascade accumulations are termed hereafter, cascade accumulations for $y$. When the amount of delay is selected to be Db, cascade accumulations of all the horizontal stages of memories M00, M10, M20; M01, M11, M21, and M02, M12, M22 are performed. These cascade accumulations are termed hereafter, cascade accumulations for $x$. With such operation, the condition of the two dimensional cascade accumulator, and specifically the contents of all of the memories after cascade accumulations for both $y$ and $x$ are performed, is invariant irrespective of the order of cascade accumulations for $x$ and $y$.

Figure 19:
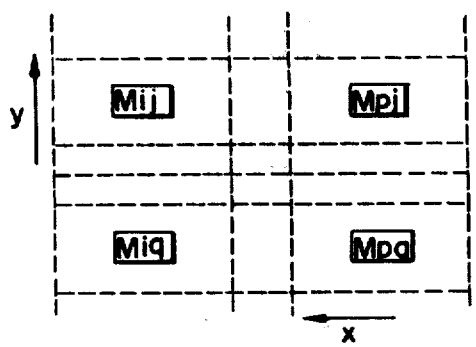
FIG. 19 also shows schematically a memory arrangement which serves to facilitate a discussion of a multi-dimensional cascade accumulation in accordance with this invention.

Reference is made to FIG. 19 to explain this point. The FIGURE shows a matrix of two dimensional memories, in which there are depicted explicitly only four memories Mij, Mpj, Miq, Mpq, where $p \geq i, q \geq j$. Consider that an initial value $a_{pq}'$ is loaded into the memory Mpq and cascade accumulations are performed at first for $(y)$ and then for $(x)$. When cascade accumulations for $(y)$ are performed, the accumulated value at the memory Mpj from Mpq is, as shown by the formula (10), given by:

$$a_{pq}' \phi(q - j, y) \qquad 58.$$

When the second cascade accumulations for $(x)$ are performed, the above value (58) is accumulated in cascade manner at the memory Mij, and this value is expressed by:

$$a_{pq}' \phi(q - j, y) \phi(p - i, x) \qquad 59.$$

This is the contribution of the initial value given at the memory Mpq to the content of the memory Mij when cascade accumulations for $(y)$ are performed and then cascade accumulations for $(x)$ are performed. On the other hand, when cascade accumulations are performed first for $(x)$, he initial value $a_{pq}'$ in the memory Mpq is accumulated in cascade manner at the memory Miq, and the thus accumulated value is expressed by:

$$a_{pq}' \phi(p - i, x) \qquad 60.$$

When cascade accumulations for $(y)$ are performed the value of (60) is accumulated at the memory Mij and the value is given by:

$$a_{pq}' \phi(p - i, x) \cdot \phi(q - j, y) \qquad 61.$$

Expressions (59) and (61) show that the contribution of the initial value loaded at the memory Mpq to the memory Mij is equal whenever the cascade accumulations for $(x)$ and $(y)$ are performed irrespective of the order of the respective manipulations. This holds for every combination of two memories Mij and Mpq in the matrix. Accordingly, once an initial value is given to each of the memories, and cascade accumulations are performed for $(x)$ and $(y)$ along all of the vertical and horizontal stages of memories, the content of every one of the memories is determined exclusively by the numerical values of $(x)$ and $(y)$. From the above, it will be understood that this is true for a cascade accumulator of more than two dimensions which is described later.

Figure 20:
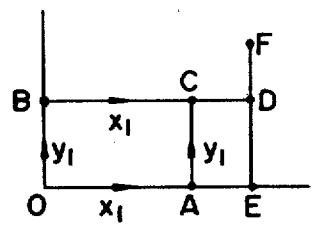
FIG. 20 is a curve plot used to facilitate a discussion of a feature of a multi-dimensional cascade accumulation in accordance with this invention.
Figure 21:
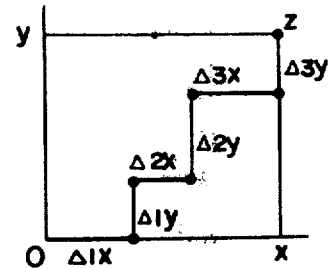
FIG. 21 also is a curve plot used to facilitate a discussion of a feature of a multi-dimensional cascade accumulation in accordance with this invention.

The above fact leads to an important feature of this invention. Referring to FIG. 20, the horizontal axis represents the value of $(x)$ and the vertical axis represents the value of $(y)$, and each point in the plane represents the condition of the two dimensional cascade accumulator corresponding to the value of $(x)$ and $(y)$. Suppose a cascade accumulator starts from an initial condition of 0, and after manipulation of cascade accumulations for $x_1$ it reaches a condition represented by A and after cascade accumulation for $y_1$, it reaches a condition represented by C. This condition is the same as that reached by the route OBC by manipulating cascade accumulations for $y_1$ and then for $x_1$. Suppose again the point C is a second initial condition and that cascade accumulations are performed to go to he point D. It is seen that the condition represented by D remains the same, irrespective of the route OACD or OBCD or OAED. From this, it is understood from FIG. 21 that by performing cascade accumulations, starting from the initial condition 0, for $\Delta_1 x$, $\Delta_1 y$, $\Delta_2 x$, $\Delta_2 y$, $\Delta_3 x$ and $\Delta_3 y$, the cascade accumulator reaches the condition $(z)$ in which the content of the memory M00 represents $f(x,y)$, where:

$$x = \Delta_1 x + \Delta_2 x + \Delta_3 x \qquad 62.$$

$$y = \Delta_1 y + \Delta_2 y + \Delta_3 y \qquad 63.$$

Figure 22:
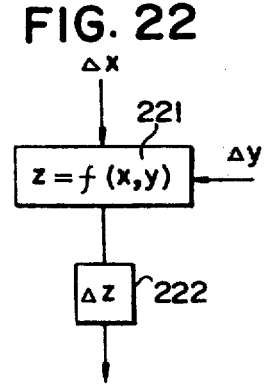
FIG. 22 is a symbolic representation of a function generator for a function having plural number of variables in accordance with this invention.

FIG. 22 shows symbolically the above explained cascade accumulator 221 which generates a function $z = f(x,y)$ by performing cascade accumulations for $\Delta x$ and $\Delta y$ and generating an incremental signal $\Delta z$ by the increment detector 222.

Figure 23:
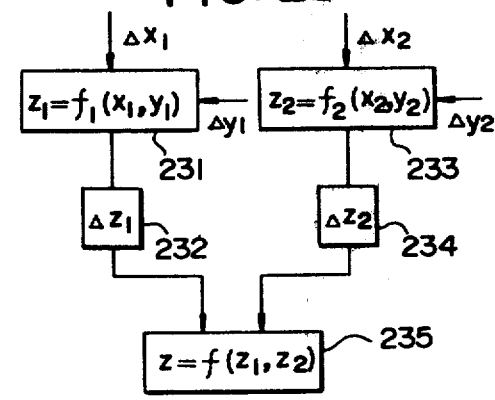
FIG. 23 shows an application of function generators each for a function having two variables, to generate a function of four variables in accordance with this invention.

FIG. 23 shows a function generator to generate a function $$z = f(z_1, z_2) \qquad 64.$$

where $$z_1 = f_1(x_1, y_1); \qquad 65.$$

$$z_2 = f_2(x_2, y_2); \text{ and} \qquad 66.$$

$x_1$, $x_2$, $y_1$, and $y_2$ are independent variables.

Each of the individual circuits of FIG. 23, comprisng the function generator 231, the increment detector 232, and the function genertor 233 and the increment detector 234 is the same as that of FIG. 22. By applying outputs of 232 and 234 to cause cascade accumulations by the function genertor 235, in time division, the function (64) is generated.

Figure 24:
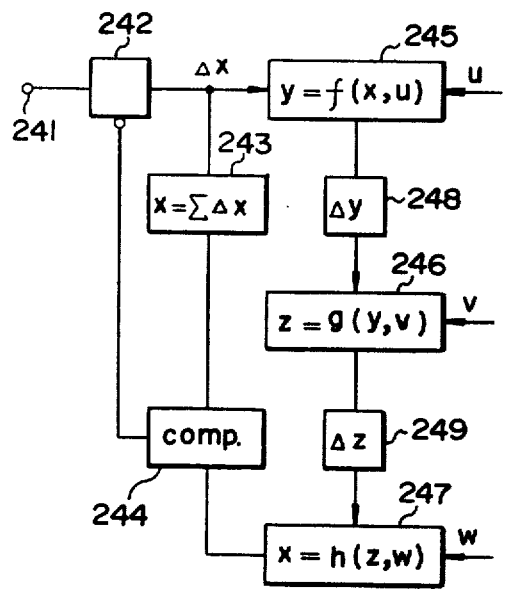
FIG. 24 shows an application of function generators each for a function having two variables, to solve a set of simultaneous equations.

FIG. 24 is an example of an application of the function generator of FIG. 22 to solve a set of three simultaneous equations:

$$y = f(x, u) \qquad 67.$$

$$z = g(Y, v) \qquad 68.$$

$$x = h(z, w) \qquad 69.$$

where $u$, $v$, $w$ are the ouputs of three real time sensors. The circuit includes function generators 245, 246 and 247 which may be as shown by FIG. 22, and increment detectors 248 and 249. The cascade accumulations of the above three function genertors first are performed for the real time sensor outputs, $u$, $v$ and $w$, as indicated by the arrows. Second cascade accumulations are performed for $\Delta x$, with respect to the function generator 245; the outputs from the $\Delta y$ increment detector 248 in turn cause the manipulation of cascade accumulations for $(y)$, with respect to the function generator 246, and the outputs from the $\Delta z$ increment detector 249 cause the cascade accumulations of the function 247 for $z$. A train of pulses is applied at the terminal 241 which, through a switch 242, operate as command pulses to cause function generator 245 to perform the cascade accumulations for $x$. These command pulses are accumulated in a counter 243, the value of which is equal to the variable $(x)$ of the function generator 245. The value ($x$) obtained in the counter 243 is compared with the value ($x$) generated in the function generator 247 by a comparator 244 which turns the switch 242 off when above two values become equal. At this time, the values of ($y$), ($z$) and ($x$) which satisfy the equations (67), (68) and (69) in real time are obtained in the function generators 245, 246 and 247, respectively.

Figure 25:
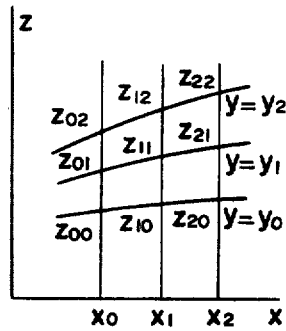
FIG. 25 shows a graph for determining the values of the coefficients of a polynomial of plural numbers of variables to represent a function.

The coefficients $a_{ij}$'s in the equations (28) through (32) may be determined theoretically by the successive, partially derived functions of $f(x,y)$ when it is expanded and expressed, with enough accuracy, by a limited number of power terms of the variables. Even though such coefficients are not determined theoretically, there are many cases where such coefficients are determined with practical accuracy. For example, the values of $z = f(x,y)$ are plotted against the variable $x$ for the values of $y = y_o, y_1, y_2$ as shown in FIG. 25, and the values of $z_{pq}$'s corresponding to $x_p$'s and $y_q$'s are obtained. Then the coefficients $a_{ij}$'s which satisfy best the simultaneous equations:

$$z_{pq} = \Sigma a_{ij} x_p^i y_q^j \qquad 70.$$

can be obtained by means of various practical methods of approximation.

Figure 26:
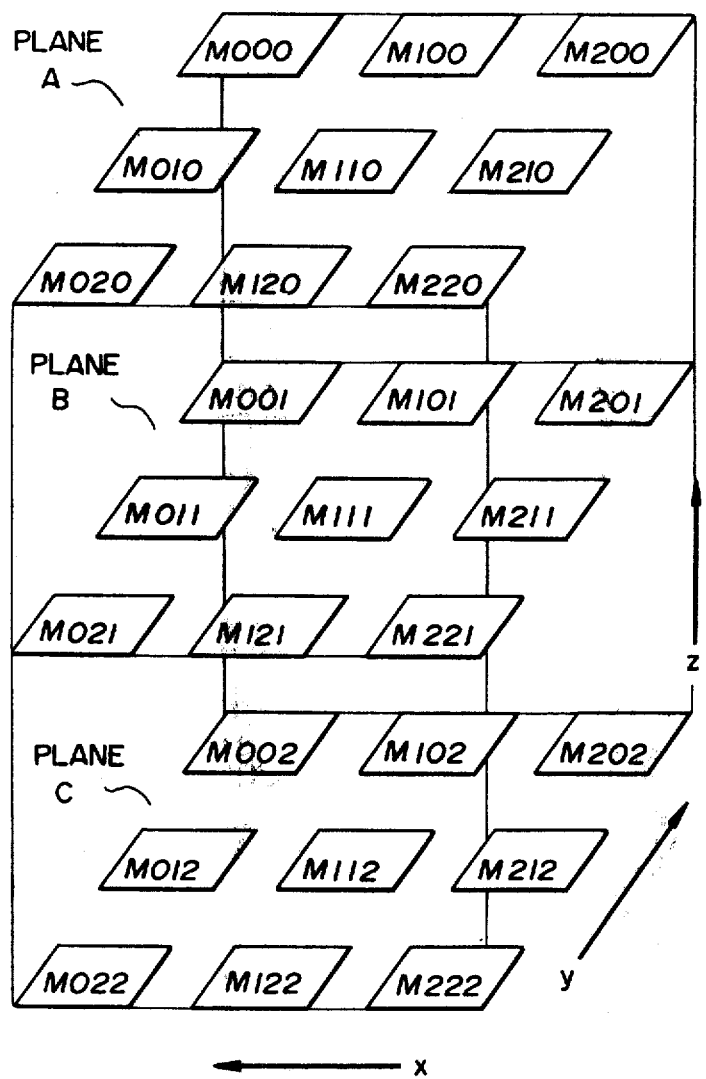
FIG. 26 shows the principle of three-dimensional cascade accumulation for generating a function of three variables, for use in this invention.

Next, there is described a function generator for three variables. FIG. 26 shows an arrangement of three dimensional memories of a cascade accumulator to generate a function:

$$w = f(x, y, z) \qquad 71.$$

In the figure, there are three planes of memories A, B and C, and, in each of the planes, memories are arranged similarly as in FIG. 18, and cascade accumulations for $x$ and $y$ are performed. Besides these cascade accumulations for $x$ and $y$, the cascade accumulations for $z$ are performed along the memory stages of M000, M001, M002; M010, M011, M012; . . . . Although it is not necessary for the implementation of this invention, if cascade accumulations are performed for all of the stages of memories along three axes $x$, $y$ and $z$, the condition of the cascade accumulator remains the same, irrespective of the order of cascade accumulations performed for $x$, $y$ and $z$; thus, the circuits shown by FIG. 22 can be generalized for a function generator of more than two variables. Moreover, to obtain the value of function (71) at the memory M000, if the cascade accumulations are performed for $z$ first, for $y$ second, and for $x$ third, then the cascade accumulations for $y$ are performed only in the plane A, and those for $x$ are performed only for the stages of memories M000, M100 and M200.

The following discussion is directed to the case where the function (71) is expanded and expressed by a series containing up to the second power of variables. Expanding the function with respect to $x$, produces:

$$f(x, y, z) = a_0 + a_1 x + a_2 x^2 \qquad 72.$$

where $a_0, a_1, a_2$ are functions of $y$ and $z$.
Expanding the coefficients of the equation (72) with respect to $y$ produces:

$$a_0 = a_{00} + a_{01} y + a_{02} y^2 \qquad 73.$$

$$a_1 = a_{10} + a_{11} y + a_{12} y^2 \qquad 74.$$

$$a_2 = a_{20} + a_{21} y + a_{22} y^2 \qquad 75.$$

where $a_{00}, a_{01}, \ldots$ are functions of $z$.
Expanding the coefficients of the equations (73), (74) and (75) with respect to $z$ produces:

$$a_{00} = a_{000} + a_{001} z + a_{002} z^2 \qquad 76.$$

$$a_{01} = a_{010} + a_{011} z + a_{012} z^2 \qquad 77.$$

$$a_{02} = a_{020} + a_{021} z + a_{022} z^2 \qquad 78.$$

$$a_{10} = a_{100} + a_{101} z + a_{102} z^2 \qquad 79.$$

$$a_{11} = a_{110} + a_{111} z + a_{112} z^2 \qquad 80.$$

$$a_{12} = a_{120} + a_{121} z + a_{122} z^2 \qquad 81.$$

$$a_{20} = a_{200} + a_{201} z + a_{202} z^2 \qquad 82.$$

$$a_{21} = a_{210} + a_{211} z + a_{212} z^2 \qquad 83.$$

$$a_{22} = a_{220} + a_{221} z + a_{222} z^2 \qquad 84.$$

where the coefficients of equations (76) through (84) are constants.

An example is set forth below of developing the initial values to be loaded at the memories M110, M111 and M112 for obtaining the value of the function $f(x, y, z)$ at the memory M000 wherein the cascade accumulations which are performed for $x$, $y$ and $z$ are all of the second kind. After the cascade accumulations for $z$ and $y$ are performed and before the cascade accumulations for $x$ start, initial values to generate the function (72) should be obtained at the memories M000, M100 and M200. For the memory M100, the initial value is represented by:

$$a_{100}''' = a_1 + a_2 \qquad 85.$$

where the three primes of $a_{100}'''$ indicate that it is the third initial value at the memory M100 for the third cascade accumulation to be performed for $x$, after first and second cascade accumulations have been performed for $z$ and $y$. In the following, the number of primes has a similar connotation. Substituting equations (74) and (75) into equation (85) yields:

$$a_{100}''' = (a_{10} + a_{20}) + (a_{11} + a_{21})y + (a_{12} + a_{22})y^2 \qquad 86.$$

This value is the value obtained at the memory M100 after the cascade accumulations for $y$ have been performed along the stages of memories M100, M110, and M120; therefore, the initial value in the memory M110 before the cascade accumlations start for $y$ is given by:

$$a_{110}'' = a_{11} + a_{21} + a_{12} + a_{22} \qquad 87.$$

Substituting equations (80), (81), (83) and (84) in equation (87) yields:

$$a_{110}'' = (a_{110} + a_{210} + a_{120} + a_{220}) + (a_{111} + a_{211} + a_{121} + a_{221})z + (a_{112} + a_{212} + a_{122} + a_{222})z^2 \qquad 88.$$

As this value is the result of cascade accumulations for $z$ along the stages of memories M110, M111, M112, the first initial values to be loaded at the memories M110, M111, M112 are given respectively as:

$$a'_{110} = a_{110} + a_{210} + a_{120} + a_{220} \qquad 89.$$

$$a'_{111} = a_{111} + a_{211} + a_{121} + a_{221} \qquad 90.$$

$$+ a_{112} + a_{212} + a_{122} + a_{222}$$
$$a'_{112} = 2(a_{112} + a_{212} + a_{122} + a_{222})$$
91.

The first initial values to be loaded in the other memories are determined likewise.

It is clear that by means of utilizing the cascade accumulator of a single variable for each of the stages of memories of a three dimensional arrangement of memories, the above explained function of three variables can be generated.

Figure 27:
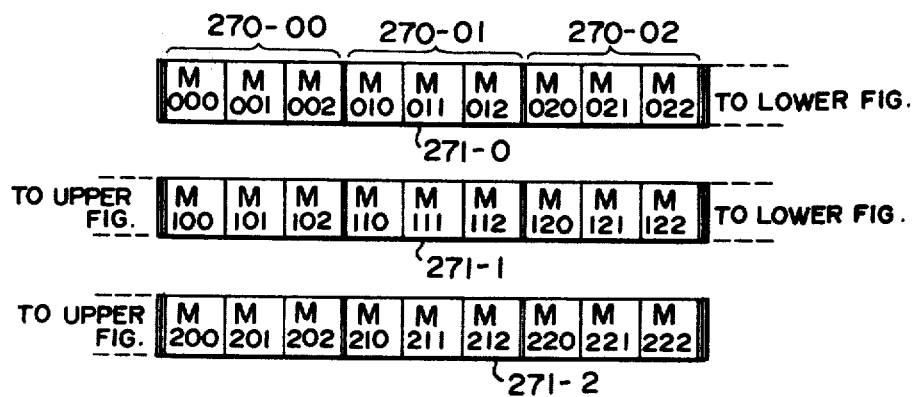
FIG. 27 shows a shift register for use as a three-dimensional cascade accumulator in accordance with this invention.

FIG. 27 shows an example of a shift register to be used in a three variable function generator in accordance with this invention. The register is divided into three blocks 271-0, 271-1 and 271-2, and each of the blocks is subdivided into three sections such as 270-00, 270-01 and 270-02 in the block 271-0 and so on, and in each section three memories are located, such as M000, M001, and M002 in section 270-00 and so on. By replacing the shift registers 141, 151, 161, 171 in FIGS. 14 through 17, respectively, with that of FIG. 27, and adding one more delay length to each of the delay circuits 142, 152, 162, 172 for selection by the corresponding one of the gates 145, 155, 165, 175, cascade accumulators for generation of a function of three variables are constructed. In relation to FIG. 26, by selecting the delay length to equal that of the memory, cascade accumulations for $(z)$ are performed, by selecting the delay length to equal that of the section, cascade accumulations for $(y)$ are performed, and by selecting the delay length to equal that of a block, cascade accumulations for $(x)$ are performed, and as a result the value of the function $f(x, y, z)$ is obtained at the memory M000.

Figure 31A:
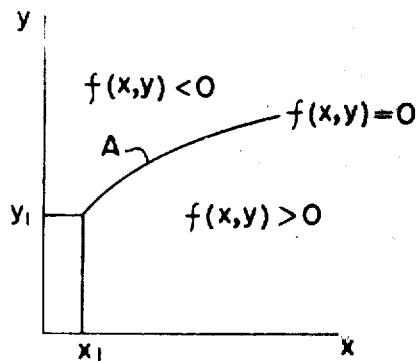
FIG. 31A and FIG. 31B are explanatory drawings for facilitating an explanation of a technique for obtaining the value of an implicit function in accordance with a particular application of this invention.
Figure 31B:
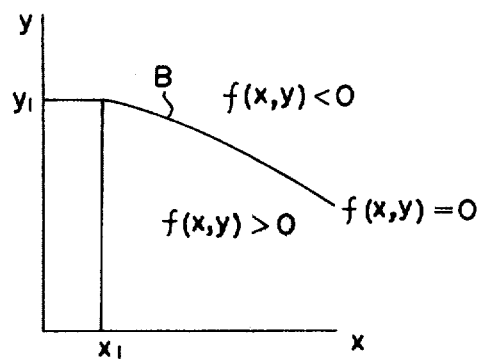

Now it will be clear that, under the concept of this invention, by means of multi-dimensional cascade accumulation, a function having a plural number of variables is generated. These cascade accumulations are performed along the stages of memories in each of the dimensions by the circuits shown before. Further to the examples of applications of the present invention described before, this invention can also be used to obtain the value of an implicit function $y$ of an independent variable $x$ expressed by $$f(x, y, u) = 0 \qquad 92.$$

where $(u)$ may be the output of a real time sensor. For a given value of $(u)$, the equation (92) is reduced to the form:

$$f(x, y) = 0 \qquad 93.$$

and the value of $f(x, y)$ is generated by the function generator explained with respect to FIG. 22. The curve A of FIG. 31 (A) shows the relation of $x$ and $y$ which satisfy the equation (93). Suppose that in the area under the curve A the value of $f(x, y)$ is positive and in the area above the curve A the value of $f(x, y)$ is negative. A two dimensional cascade accumulator to generate the function f(x, y) is started from the initial condition corresponding to $x = x_1, y = y_1$ of FIG. 31 (A), and cascade accumulations for $\Delta x$ are performed and the sign of $f(x, y)$ is checked; when the detected sign is positive, then cascade accumulations for $\Delta y$ are performed until the detected sign of $f(x, y)$ becomes negative, at which time the cascade accumulations for $\Delta x$ are performed again until the sign of $f(x, y)$ turns positive. By repeating the above operations for small increments of $\Delta x$ and $\Delta y$, the values of $y$ corresponding to the independent variable $x$ of equation (93) are obtained. In the region where the value of $y$ decreases with increasing $x$ as shown by the curve B of FIG. 31 (B), a complementary mode for the cascade accumulation for $y$ is used, and the control to perform the cascade accumulations for $x$ and $y$ according to the sign of $f(x, y)$ is reversed in this specific example.

Figure 32:
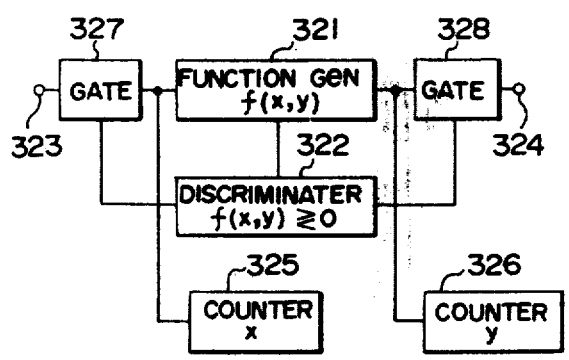
FIG. 32 shows a block diagram of a system for generating the value of an implicit function with respect to the value of an independent variable.

FIGS. 32 shows a block diagram of a system for performing the above operation. In FIG. 32, block 321 is the function generator for performing the function $f(x, y)$ as explained in FIG. 22. Cascade accumulations for $(x)$ are performed by command pulses applied at the terminal 323 and passed through the gate 327. The cascade accumulations for $(y)$ are performed by command pulses applied at the terminal 324 and passed through the gate 328. The sign of the value of the function $f(x, y)$ is detected by the discriminator 322, and when $f(x, y)$ is detected positive the discriminator 322 closes the gate 327 and opens the gate 328 and the cascade accumulations for $y$ are performed until the discriminator detects the negative sign. At this instant the discriminator opens the gate 327 and closes the gate 328 and cascade accumulations for $(x)$ are performed until the change of sign is detected. By giving initial values $x_1$ and $y_1$ to the counters 325 and 326, which count the command pulses for $x$ and $y$, respectively, the value of the implicit function $y$ and the variable $x$ are obtained in the counters 326 and 325, respectively.

Figure 33:
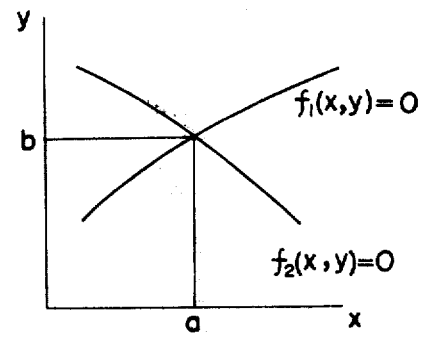
FIG. 33 is a curve plot for facilitating an explanation of the solution of a pair of simultaneous equations in accordance with a particular application of this invention.

FIG. 33 is a plot of curves for explaining the solution of a pair of simultaneous equations $$f_1(x, y) = 0, f_2(x, y) = 0 \qquad 94.$$

Two circuits of the type of FIG. 32 are used for this application, one for $f_1(x, y)$ and the other for $f_2(x, y)$. Common command pulses are used for the cascade accumulations for $x$ of both function generators, and the value of $y$ obtained at the counter 326 of one of the circuits is compared with that of the value obtained in the other circuit. When coincidence is detected between the values of $y$ obtained at the counter 326 of the two circuits, the command pulses are cut off. The values of $a$ and $b$ of FIG. 33 then are obtained in the counters 325 and 326, respectively.

Numerous modifications and adaptations of the system of the invention will be apparent to those skilled in the art and thus it is intended by the appended claims to cover all such modifications and adaptations which fall within the true spirit and scope of the invention.

What is claimed is:

1. Apparatus for obtaining a digital value of a function expressed by:

$$w = \Sigma a_{i_1 i_2 \ldots i_j \ldots i_n} x_1^{i_1} x_2^{i_2} \ldots x_j^{i_j} \ldots x_n^{i_n}$$

where $w$ is the function the value of which is to be obtained, $a_{i_1 i_2 i_j \ldots i_n}$'s are constants, $x_1, x_2, \ldots, x_j, \ldots, x_n$ are the independent variables, $i_j = 0, 1, 2, \ldots, m_j$, and at least one of $m_j$'s $\geq 2$, where $j = 1, 2, \ldots, n$ and represents the dimension of a multidimensional function, wherein $n \geq 2$ comprising:

a. memories designated by multi-dimensional addresses $(i_1, i_2, \ldots, i_j, \ldots, i_n)$ where $i_j = 0, 1, 2, \ldots, m_j$ and at least one $m_j \geq 2$, each memory having a word length and means for loading said memories with respective, specific, initial numerical values determined by the constants $a_{i_1, i_2, \ldots, i_j, \ldots, i_n}$'s, b. means for performing algebraic additions of the contents of the memories designated by the addresses $(i_1, i_2, \ldots, i_{j-1}, i_j+1, i_{j+1}, \ldots, i_n)$ to the contents of the memories designated by the addresses $(i_1, i_2, \ldots, i_{j-1}, i_j, i_{j+1}, \ldots, i_n)$ for $i_j = 0, 1, 2, \ldots, m_j-1$ in a predetermined sequence, said algebraic additions being performed with respect to every combination of $i_1, i_2, \ldots, i_{j-1}$ and at least $i_{j+1} = 0, i_{j+2} = 0, \ldots, i_n = 0$ in corresponding cycles, said means for performing algebraic additions including:

b-1. adder means, b-2. means for selectively interconnecting the outputs and inputs of said memories and said adder means for each said cycle of algebraic additions and for maintaining said interconnections during each said cycle, and b-3. means to control said interconnecting means and said adder means to perform a number of said cycles of algebraic additions in total corresponding to the value of each variable $x_j$ for all of the variables $x_j$, where $j = 1, 2, \ldots, n$ whereby the value of the function $w$ is obtained in the memory of address $(0,0,0, \ldots, 0)$.

2. Apparatus as claimed in claim 1 wherein said means for performing algebraic additions comprises:

means for arranging said memories of multi-dimensional addresses in a shift register means, delay means, the amount of delay thereof being selectable, said adder means having first and second inputs, and said control means selecting the amount of delay of said delay means in accordance with the dimension $j$ of the variable $x_j$ corresponding to which said cycles of algebraic additions are to be performed, and reading out said shift register means and controlling said selective interconnecting means to interconnect said shift register means, said adder means and said delay means for applying digits read out from said shift register means to one of the inputs of said adder means and for applying the output digits from said adder means to the other input of said adder means through said delay means in accordance with the selected delay thereof and also to said shift register means for rewriting therein.

3. Apparatus as claimed in claim 2 wherein said means for performing algebraic additions further includes complementer means connected in series with said delay means between the output of said adder means and said other input thereof for complementing the digits which pass through said delay means.

4. Apparatus as claimed in claim 1 wherein said means for performing algebraic additions comprises:

means for arranging said memories of multi-dimensional addresses in a shift register means, delay means, the amount of delay thereof being selectable, said adder means having first and second inputs, and said control means selecting the amount of delay of said delay means in accordance with the dimension $j$ of the variable $x_j$ corresponding to which said cycles of algebraic additions are to be performed, and reading out said shift register means and controlling said selective interconnecting means to interconnect said shift register means, said delay means, and said adder means for applying digits read out from said shift register means to one of the inputs of said adder means and also through said delay means in accordance with the selected delay thereof to the other input of said adder means, and for applying the output digits from said adder means to said shift register means for rewriting therein.

5. Apparatus as claimed in claim 4 wherein said means for performing algebraic additions further includes complementer means connected in series with said delay means between said shift register means and said other input of said adder means for complementing the digits which pass through said delay means.

6. Apparatus as claimed in claim 1 wherein there are included $m_j+1$ memories of said multi-dimensional addresses $(i_1, i_2, \ldots, i_j, \ldots, i_n)$ where $i_j = 0, 1, 2, \ldots, m_j$, and $m_j$ adder means designated by numbers $1, 2, \ldots, m_j$, and wherein said selective interconnecting means connects said memories and said adder means for applying the digits read out from the memories of addresses $(i_1, i_2, \ldots, i_j, \ldots, i_n)$ where $i_j = 0, 1, 2, \ldots, m_j-1$, to one of the inputs of said adder means of number $i_j+1$, where $i_j = 0, 1, 2, \ldots, m_j-1$, respectively, for applying the output digits from said adder means of number $i_j+1$, where $i_j = 1, 2, \ldots, m_j-1$, to the other input of said adder means of number $i_j$, where $i_j = 1, 2, \ldots, m_j-1$, respectively, and for applying the output digits from said adder means of number $i_j+1$, where $i_j = 0, 1, 2, \ldots, m_j-1$, for rewriting into the memories of addresses $(i_1, i_2, \ldots, i_j, \ldots, i_n)$, where $i_j = 0, 1, 2, \ldots, m_j-1$, respectively, and for applying the digits non-destructively read out from the memory of address $(i_1, i_2, \ldots, i_j, \ldots, i_n)$ where $i_j = m_j$ to the other input of said adder means of number $m_j$.

7. Apparatus as claimed in claim 6, wherein each said adder means includes first and second inputs, and said means for performing algebraic additions further includes means to complement said output digits from said adder means of number $i_j+1$, where $i_j = 1, 2, \ldots, m_j-1$, for supplying the complements of the said output digits to said other input of said adder means of number $i_j$, where $i_j = 1, 2, \ldots, m_j-1$, respectively, and means to complement said non-destructively read out digits from said memory of address $(i_1, i_2, \ldots, i_j, \ldots, i_n)$, where $i_j = m_j$, for supplying the complements of the said read out digits to said other input of said adder means of number $m_j$.

8. Apparatus as claimed in claim 1 wherein there are included $m_j+1$ memories of said multi-dimensional addresses $(i_1, i_2, \ldots, i_j, \ldots, i_n)$, where $i_j = 0, 1, 2, \ldots, m_j$, and $m_j$ adder means designated by numbers $1, 2, \ldots, m_j$, and wherein said selective interconnecting means connects said memories and said adder means for applying the digits read out from the memories of addresses $(i_1, i_2, \ldots, ij, \ldots, i_n)$, where $i_j = 0, 1, 2, \ldots, m_j-1$, to one of the inputs of said adder means of number $i_j+1$, where $i_j = 0, 1, 2, \ldots, m_j-1$, respectively, for applying the digits read out from the memories of addresses $(i_1, i_2, \ldots, i_j, \ldots, i_n)$, where $i_j = 1, 2, \ldots, m_j-1$, and the non-destructively read out digits from the memory of the address $(i_1, i_2, \ldots, i_j, \ldots, i_n)$, where $i_j = m_j$, to the other input of said adder means of number $i_j$, where $i_j = 1, 2, \ldots, m_j$, respectively, and applies the output of the adder means of number $i_j+1$, where $i_j$ = 0, 1, 2, ..., $m_j-1$ to the memories of addresses ($i_1$, $i_2$, ..., $i_j$, ..., $i_n$) where $i_j$ = 0, 1, 2, ..., $m_j-1$, respectively, for rewriting therein.

9. Apparatus as claimed in claim 8, wherein said means for performing algebraic additions further includes complementer means connected between said memories of addresses ($i_1$, $i_2$, ..., $i_j$, ..., $i_n$) where $i_j$ = 1, 2, ..., $m_j$ and said other input of said adder means of the number $i_j$, where $i_j$ = 1, 2, ..., $m_j$, respectively, to complement the digits read from said memories for applying the complements of the said read out digits to the respective said adder means.

10. Apparatus for obtaining a digital value of a function expressed by:

$$w = a_0 + a_1 x + a_2 x^2 + \ldots + a_i x^i + \ldots + a_n x^n$$

where $w$ is the function the value of which is to be obtained, $a_0, a_1, a_2, \ldots, a_i, \ldots, a_n$ are constants, $x$ is the independent variable, and $n \geq 2$ comprising:

plural memories designated by addresses 0, 1, 2, ..., $i$, ..., $n$, each having a word length and means for loading said memories with a specific, initial numerical value determined by the constants $a_0$, $a_1$, $a_2$, ..., $a_i$, ... $a_n$, means for arranging said memories in a shift register means, algebraic addition means having first and second inputs and an output, delay means having an input and an output, means connecting the output of said shift register to one of the inputs of said algebraic addition means, means connecting the output of said algebraic addition means to the input of said shift register means, and also to the input of said delay means, means connecting the output of said delay means to the other input of said algebraic addition means, and means for repeatedly shifing said shift register a number of cycles corresponding to the value of the independent variable $x$.

11. Apparatus as claimed in claim 10 wherein there is further included complementer means and means for connecting said complementer means in series with said delay means.

12. Apparatus for obtaining a digital value of a function expressed by:

$$w = a_0 + a_1 x + a_2 x^2 + \ldots + a_i x^i + \ldots + a_n x^n$$

where $w$ is the function the value of which is to be obtained, $a_0, a_1, a_2, \ldots, a_i, \ldots, a_n$ are constants, $x$ is the independent variable, and $n \geq 2$ comprising:

plural memories designated by addresses 0, 1, 2, ..., $i$, ..., $n$, each having a word length and means for loading said memories with a specific, initial numerical value determined by the constants $a_0$, $a_1$, $a_2$, ..., $a_i$, ..., $a_n$, means for arranging said memories in a shift register means, algebraic addition means having first and second inputs and an output and a delay means having an input and an output, means connecting the output of said shift register to one of the inputs of said algebraic addition means and also to the input of said delay means, means connecting the output of said delay means to the other input of said algebraic addition means, means connecting the output of said algebraic addition means to the input of said shift register, and means for repeatedly shifting said shift register a number of cycles corresponding to the value of the independent variable $x$.

13. Apparatus as claimed in claim 12 wherein there is further included complementer means and means for connecting said complementer means in series with said delay means.

14. Apparatus for obtaining a digital value of a function expressed by:

$$w = a_0 + a_1 x + a_2 x^2 + \ldots + a_i x^i + \ldots + a_n x^n$$

where $w$ is the function the value of which is to be obtained, $a_0, a_1, a_2, \ldots, a_i, \ldots, a_n$ are constants, $x$ is the independent variable, and $n \geq 2$ comprising:

plural memories designated by addresses 0, 1, 2, ..., $i$, ..., $n$, each having a word length and means for loading said memories with a specific, initial numerical value determined by the constants $a_0$, $a_1$, $a_2$, ..., $a_i$, ..., $a_n$, algebraic addition means designated by numbers 1, 2, ..., $i$, ..., $n$ each having first and second inputs and an output, means for reading out said memories of addresses 0, 1, 2, ..., $n-1$ and for non-destructively reading out said memory of address $n$, and for supplying the read out digits from the memories of addresses 0, 1, 2, ..., $n-1$ to one of the inputs of said algebraic addition means designated by respective numbers 1, 2, ..., $n$ and for supplying the digits read out from the memories of addresses 1, 2, ..., $n-1$ and the digits non-destructively read out from the memory of address $n$ to the other input of said algebraic addition means of number 1, 2, ..., $n$, respectively, and means for connecting the outputs of said algebraic addition means of number 1, 2, ..., $n$ to the inputs of said memories of addresses 0, 1, 2, ..., $n-1$, respectively for rewriting therein, and means to repeatedly read out all said memories a number of times corresponding to the value of the independent variable $x$.

15. Apparatus as claimed in claim 14 wherein there are further included complementer means connected to the outputs of said memories of addresses 1, 2, ..., $n$ to complement the digits read out from said memories of addresses 1, 2, ..., $n$ thereby to supply the complement of the digits as read out to said other inputs of said algebraic addition means of number 1, 2, ..., $n$, respectively.

16. Apparatus for obtaining a digital value of a function expressed by:

$$x = b_1 w + b_2 w^2 + \ldots + b_n w^n$$

where $w$ is the function the value of which is to be obtained, $b_1, b_2, \ldots, b_n$ are constants, $x$ is the independent variable,
$n$ is a positive integer and $n \geq 2$, comprising:
a. a cascade accumulation means comprising memory means designated by addresses $0, 1, 2, \ldots, n$ each having a word length, means for loading each of said memory means with a respective, specific, initial numerical value, and means for arranging said memory means serially as a shift register means, an algebraic addition means having first and second inputs and one output and a delay means having an input and an output, means for reading out the digits stored in said shift register means, means leading the read out digits from said shift register means to one of the inputs of said algebraic addition means, means leading the output digits from said algebraic addition means to the input of said shift register means for rewriting therein and also to the input of said delay means, and means for leading the output digits from said delay means to the other input of said algebraic addition means, wherein one cascade accumulation is performed by shifting said shift register means one cycle,
b. means for generating a number of command signals corresponding to the value of said independent variable $x$,
c. a further non-destructively read memory means designated by an address d loaded with a specific numerical value, and a further algebraic addition means designated by number 0 having first and second inputs and one output.
d. means for reading out said memory means designated by address 0 in said cascade accumulation means and means for leading output digits therefrom to one of the inputs of said algebraic addition means designated by number 0, means for reading out said memory means designated by address $d$ and means for leading the output digits therefrom to the other input of said algebraic addition means designated by number 0, means for leading the output digits from said algebraic addition means designated by number 0 to the input of said memory means designated by address 0 in said cascade accumulation means for rewriting therein, and means for reading out said memory means designated by address 0 in said cascade accumulation means and said memory means designated by address $d$ once, corresponding to each of said command signals,
e. means to produce a number of secondary command signals corresponding to the increment of the content of said memory means designated by address 0 in said cascade accumulation means at each command signal, and
f. means for performing said one cascade accumulation of said cascade accumulation means in response to each of said secondary command signals, whereby the value of said function $w$ is obtained in said memory means designated by address 0 in said cascade accumulation means.

17. Apparatus for obtaining a digital value of a function expressed by:

$$x = b_1w + b_2w^2 + \ldots + b_nw^n$$

where $w$ is the function the value of which is to be obtained,
$b_1, b_2, \ldots, b_n$ are constants, $x$ is the independent variable,
$n$ is a positive integer and $n \geq 2$, comprising:
a. a cascade accumulation means comprising memory means designated by addresses $0, 1, 2, \ldots, n$ each having a word length, means for loading each of said memory means with a respective, specific, initial numerical value, and means for arranging said memory means serially as a shift register means, an algebraic addition means having first and second inputs and one output and a delay means having an input and an output, means for reading out the digits stored in said shift register means, means leading the read out digits from said shift register means to one of the inputs of said algebraic addition means and also to the input of said delay means, means leading the output digits from said algebraic addition means to the input of said shift register means for rewriting therein, and means for leading the output digits from said delay means to the other input of said algebraic addition means, wherein one cascade accumulation is performed by shifting said shift register means one cycle,
b. means for generating a number of command signals corresponding to the value of said independent variable $x$,
c. a further non-destructively read memory means designated by an address $d$ loaded with a specific numerical value, and a further algebraic addition means designated by number 0 having first and second inputs and one output,
d. means for reading out said memory means designated by address 0 in said cascade accumulation means and means for leading output digits therefrom to one of the inputs of said algebraic addition means designated by number 0, means for reading out said memory means designated by address $d$ and means for leading the output digits therefrom to the other input of said algebraic addition means designated by number 0, means for leading the output digits from said algebraic addition means designated by number 0 to the input of said memory means designated by address 0 in said cascade accumulation means for rewriting therein, and means for reading out said memory means designated by address 0 in said cascade accumulation means and said memory means designated by address $d$ once, coresponding to each of said command signals,
e. means to produce a number of secondary command signals corresponding to the increment of the content of said memory means designated by address 0 in said cascade accumulation means at each command signal,
f. means for performing said one cascade accumulation of said cascade accumulation means in response to each of said secondary command signals, and
whereby the value of said function $w$ is obtained in said memory means designated by address 0 in said cascade accumulation means.

18. apparatus for obtaining a digital value of a function expressed by:

$$x = b_1w + b_2w^2 + \ldots + b_nw^n$$

where $w$ is the function the value of which is to be obtaind, $b_1, b_2, \ldots, b_n$ are constants,
$x$ is the independent variable,
$n$ is a positive integer and $n \geq 2$,
comprising:
  a. a cascade accumulation means comprising memory menas designated by addresses $0, 1, 2, \ldots, n$ each having a word length, means for loading each of said memory means with a respective, specific, initial numerical value, algebraic addition means designated by numbers $1, 2, \ldots, n$ each having first and second inputs and one output, means for reading out said memory means designated by addresses $0, 1, 2, \ldots, n-1$ and for non-destructively reading out said memory means designated by address $n$, and for leading the digits thus read out from the memory means designated by addresses $0, 1, 2, \ldots, n-1$ to one of the inputs of said algebraic addition means designated by numbers $1, 2, \ldots, n$ respectively, and for leading the digits read out from said memory means designated by addresses $1, 2, \ldots, n-1$ and the non-destructively read out digits from said memory means designated by address $n$ to the other inputs of said algebraic addition means designated by numbers $1, 2, \ldots, n$ respectively, and means for leading the output digits from said algebraic addition means designated by numbers $1, 2, \ldots, n$ to said memory means designated by addresses $0, 1, 2, \ldots, n-1$ respectively for rewriting therein, wherein one cascade accumulation is performed by reading out said memory means designated by addresses $0, 1, 2, \ldots, n$, once,
  b. means for generating a number of command signals corresponding to the value of said independent variable $x$,
  c. a further non-destructively read memory means designated by an address $d$ loaded with a specific numerical value, and a further algebraic addition means designated by number $0$ having first and second inputs and one output,
  d. means for reading out said memory means designated by address $0$ in said cascade accumulation means and means for leading output digits therefrom to one of the inputs of said algebraic addition means designated by number $0$, means for reading out said memory means designated by address $d$ and means for leading the output digits therefrom to the other input of said algebraic addition means designated by number $0$, means for leading the output digits from said algebraic addition means designated by numeer $0$ to the input of said memory means designated by address $0$ in said cascade accumulation means for rewriting therein, and means for reading out said memory means designated by address $0$ in said cascade accumulation means and said memory means designated by address $d$ once, corresponding to each of said command signals,
  e. means to produce a number of secondary command signals corresponding to the increment of the content of said memory means designated by address $0$ in said cascade accumulation means at each command signal,
  f. means for performing said one cascade accumulation of said cascade accumulation means in response to each of said secondary command signals, and the value of said function $w$ is obtained in said memory means designated by address $0$ in said cascade accumulation means.

19. Apparatus for obtaining a digital value of a function $w$ expressed by:

$$w = \Sigma a_{i_1 i_2 \ldots i_j \ldots i_n} x_1^{i_1} x_2^{i_2} \ldots x_j^{i_j} \ldots x_n^{i_n}$$

where $a_{i_1 i_2 \ldots i_j \ldots i_n}$'s are constants,
$x_j$'s are the independent variables,
$n$ is a positive integer and $n \geq 2$,
$j = 1, 2, \ldots, n$,
$i_j = 0, 1, 2, \ldots, m_j$, and
$m_j$'s are positive integers and at least one of $m_j$'s $\geq 2$, comprising:
  a. memory means each having a word length and designated by a multi-dimensional address $(i_1, i_2, \ldots, i_j, \ldots, i_n)$ where $i_j$ can assume any one of the numerical values of $0, 1, 2, \ldots, m_j$, and represents a component of said multi-dimensional address in the $j$ th dimension,
  b. means for loading each of said memory means of multi-dimensional addresses with a respective specific initial numerical value determined by the constants $a_{i_1 i_2 \ldots i_j \ldots i_n}$'s,
  c. means for performing an element of operation in the $j$ th dimension comprising:
    1. means for connecting said memory means designated by multi-dimensional addresses $(i_1, i_2, \ldots, i_{j-1}, i_j, i_{j+1}, \ldots, i_n)$ each having a serial number $i_j = 0, 1, 2, \ldots, m_j$ as a component in the $j$ th dimension and having identical components in the other dimensions, serially to form a shift register means,
    2. algebraic addition means having two inputs and one output,
    3. delay means having an input and an output,
    4. means for selectively supplying the output digits from said shift register means to one of the inputs of said algebraic addition means,
    5. means for selectively supplying the output digits from said algebraic addition means to the input of said shift register means for rewriting therein,
    6. means for selectively supplying the output digits from said algebraic addition means to the input of said delay means,
    7. means for selectively supplying the output digits from said delay means to the other input of said algebraic addition means, and
    8. means for shifting said shift register means a number of cycles corresponding to the value of the independent variable $x_j$, and wherein
  a set of operations in the $j$ th dimension comprises performing said element of operation regarding the $j$ th dimension with respect to every combination of the numerical values of $i_1, i_2, \ldots, i_{j-1}$ and at least $i_{j+1} = 0$, $i_{j+2} = 0, \ldots, i_n = 0$, and
  d. means for executing said set of operations in the $j$ th dimension with respect to every dimension to obtain the value of the function $w$ in the memory means of multi-dimensional address $(0, 0, \ldots, 0)$.

20. Apparatus as recited in claim 19, wherein said set of operations in the $j$ th dimension comprises performing said element of operation regarding the $j$ th dimension with respect to every combination of the numerical values of $i_1, i_2, \ldots, i_{j-1}$ and only for $i_{j+1} = 0, i_{j+2} = 0, \ldots, i_n = 0$, and said executing means executes said set of operations in the $j$ th dimension with respect to every dimension according to the order of $j = n-1, \ldots, 2, 1$ to obtain the value of the function $w$ in the memory means of multi-dimensional address $(0, 0, \ldots, 0)$.

21. Apparatus as claimed in claim 19, wherein there is further included complementer means connected in series with said delay means between the output of said algebraic addition means and the other input of said algebraic addition means for any one of said set of operations regarding the $j$ th dimension.

22. Apparatus for obtaining a digital value of a function $w$ expressed by:

$$w = \Sigma a_{i_1 i_2 \ldots i_j \ldots i_n} x_1^{i_1} x_2^{i_2} \ldots x_j^{i_j} \ldots x_n^{i_n}$$

where $a_{i_1 i_2 \ldots i_j \ldots i_n}$'s are constants,
$x_j$'s are the independent variables,
$n$ is a positive integer and $n \geq 2$,
$j = 1, 2, \ldots, n$,
$i_j = 0, 1, 2, \ldots, m_j$, and
$m_j$'s are positive integers and at least one of $m_j$'s $\geq 2$, comprising:

a. memory the each having a word length and designated by a multi-dimensional address $(i_1, i_2, \ldots, i_j, \ldots, i_n)$ where $i_j$ can assume any one of th numerical values of $0, 1, 2, \ldots, m_j$, and represents a component of said multi-dimensional address in the $j$ th dimension, b. means for loading each of said memory means of multidimensional addresses with a respective specific initial numerical value determined by the constants $a_{i_1 \ldots i \ldots i}$'s, c. means for performing an element of operation in the $j$ th dimension comprising:

1. means for connecting said memory means, designated by multi-dimensional addresses $(i_1, i_2, \ldots, i_{j-1}, i_j, i_{j+1}, \ldots, i_n)$ each having a serial number $i_j = 0, 1, 2, \ldots, m_j$ as a component in the $j$ th dimension and having identical components in the other dimensions, serially to form a shift register means, 2. algebraic addition means having two inputs and one output.

3. delay means having an input and an output, 4. means for selectively supplying the output digits from said shift register means to one of the inputs of said algebraic addition means, 5. means for selectively supplying the output digits from said algebraic addition means to the input of said shift register means for rewriting therein, 6. means for selectively supplying the output digits from said shift register means to the input of said delay means, 7. means for selectively supplying the output digits from said delay means to the other input of said algebraic addition means, and 8. means for shifting said shift register means a number of cycles corresponding to the value of the independent variable $x_j$, and wherein a set of operations in the $j$ th dimension comprises performing said element of operation regarding the $j$ th dimension with respect to every combination of the numerical values of $i_1, i_2, \ldots, i_{j-1}$ and at least $i_{j+1} = 0$, $i_{j+2} = 0, \ldots, i_n = 0$ and d. means for executing said set of operations in the $j$ th dimension with respect to every dimension to obtain the value of the function $w$ in the memory means of multi-dimensional address $(0, 0, \ldots, 0)$.

23. Apparatus as recited in claim 22, wherein said set of operations in the $j$ th dimension comprises performing said element of operation regarding the $j$ th dimension with respect to every combination of the numerical values of $i_1, i_2, \ldots, i_{j-1}$ and only for $i_{j+1} = 0$, $i_{j+2} = 0, \ldots, i_n = 0$, and said executing means executes said set of operations in the $j$ th dimension with respect to every dimension according to the order $j = n, n-1, \ldots, 2, 1$ to obtain the value of the function $w$ in the memory means of multi-dimensional address $(0, 0, \ldots, 0)$.

24. Apparatus as claimed in claim 22, wherein there is further included complementer means connected in series with said delay means between the output of said register means and the other input of said algebraic addition means for any one of said set of operations regarding the $j$ th dimension.

25. Apparatus for obtaining a digital value of a function $w$ expressed by:

$$w = \Sigma a_{i_1 i_2 \ldots i_j \ldots i_n} x_1^{i_1} x_2^{i_2} \ldots x_j^{i_j} \ldots x_n^{i_n}$$

where $a_{i_1 i_2 \ldots i_j \ldots i_n}$'s are constants,
$x_j$'s are the independent variables,
$n$ is a positive integer and $n \geq 2$,
$j = 1, 2, \ldots, n$,
$i_j = 0, 1, 2, \ldots, m_j$, and
$m_j$'s are positive integers and at least one of $m_j$'s $\geq 2$, comprising:

a. memory means each having a word length and designated by a multi-dimensional address $(i_1, i_2, \ldots, i_j, \ldots, i_n)$ where $i_j$ can assume any one of the numerical values of $0, 1, 2, \ldots, m_j$, and represents a component of said multi-dimensional address in the $j$ th dimension, b. means for loading each of said memory means of multidimensional addresses with a respective specific initial numerical value determined by the constants $a_{i_1 \ldots i \ldots i}$'s, c. means for performing an element of operation in the $j$ th dimension comprising:

1. memory means designated by multi-dimensional addresses $(i_1, i_2, \ldots, i_{j-1}, i_j, i_{j+1}, \ldots, i_n)$ each having a serial number $i_j = 0, 1, 2, \ldots, m_j$ as the component in the $j$ th dimension ahd having identical components in the othe dimensions, 2. algebraic addition means designated by numbers $1, 2, \ldots, m_j$ each having first and second inputs and one output, 3. means for reading out said memory means designated by multi-dimensional addresses each having a serial number $i_j = 0, 1, 2, \ldots, m_j-1$ as a component in the j th dimension and nondestructively reading out said memory means designated by multi-dimensional address having number $i_j = m_j$ as the component in the $j$ th dimension, and for selectively supplying the read out digits from the memory means designated by multi-dimensional addresses each having a serial number $i_j = 0, 1, 2, \ldots, m_j-1$ as a component in the $j$ th dimension to said first inputs of said algebraic addition means designated by numbers $1, 2, \ldots, m_j$ respectively, and for selectively supplying the output digits from said algebraic addition means designated by numbers $2, 3, \ldots, m_j$ and the nondestructively read out digits from said memory means designated by multi-dimensional address having number $i_j = m_j$ as the component in the $j$ th dimension to said second inputs of said algebraic addition means of number $1, 2, \ldots, m_j$ respectively, and means for selectively supplying the outputs of said algebraic addition means designated by numbers 1, 2, . . . , $m_j$ to the inputs of said memory means designated by the multi-dimensional addresses each having a serial number 0, 1, 2, . . . , $m_j$−1 as the component in the $j$ th dimension respectively for rewriting therein, 4. means for reading out said memory means designated by multi-dimensional addresses each having a serial number $i_j$ = 0, 1, 2, . . . , $m_j$ as the component in the $j$ th dimension a number of times corresponding to the value of the independent variable $x_j$, and wherein a set of operations in the $j$ th dimension comprises performing said element of operation regarding the $j$ th dimension with respect to every combination of the numerical values of $i_1, i_2, . . . , i_{j-1}$ and at least $i_{j+1} = 0$, $i_{j+2} = 0, . . . , i_n = 0$, and d. means for executing said set of operations in the $j$ th dimension with respect to every dimension to obtain the value of the function $w$ in the memory means of multi-dimensional address (0, 0, . . . , 0).

26. Apparatus as recited in claim 25, wherein said set of operations in the $j$ th dimension comprises performing said element of operation regarding the $j$ th dimension with respect to every combination of the numerical values of $i_1, i_2, . . . , i_{j-1}$ and only for $i_{j+1} = 0, i_{j+2} = 0, . . . , i_n = 0$, and said executing means executes said set of operations in the $j$ th dimension with respect to every dimension according to the order $j = n, n-1, . . . , 2, 1$ to obtain the value of the function $w$ in the memory means of multi-dimensional address (0, 0, . . . , 0).

27. Apparatus as claimed in claim 25 wherein there are further included complementer means connected in series with each of said second inputs of said algebraic addition means designated by numbers 1, 2, . . . , $m_j$ for any one of said set of operations regarding the $j$ th dimension.

28. Apparatus for obtaining a digital value of a function $w$ expressed by:

$$w = \Sigma a_{i_1 i_2 \ldots i_j \ldots i_n} x_1{}^{i_1} x_2{}^{i_2} \ldots x_j{}^{i_j} \ldots x_n{}^{i_n}$$

where $a_{i_1 i_2 \ldots i_j \ldots i_n}$'s are constants,
$x_j$'s are the independent variables,
$n$ is a positive integer and $n \geq 2$,
$j = 1, 2, . . . , n$,
$i_j = 2, 1, 2, . . . , m_j$, and
$m_j$'s are positive integers and at least one of $m_j$'s $\geq 2$, comprising:

a. memory means each having a word length and designated by a multi-dimensional address ($i_1, i_2, . . . , i_j, . . . , i_n$) where $i_j$ can assume any one of the numerical values of 0, 1, 2, . . . , $m_j$, and represents a component of said multi-dimensional address in the $j$ th dimension.

b. means for loading each of said memory means of multidimensional addresses with a respective initial numerical value determined by the constants $a_{i_1 \ldots i \ldots i}$'s, c. means for performing an element of operation in the $j$ th dimension comprising:

1. memory means designated by multi-dimensional addresses ($i_1, i_2, . . . , i_{j-1}, i_j, i_{j+1}, . . . , i_n$) each having a serial number $i_j = 0, 1, 2, . . . , m_j$ as the component in the $j$ th dimension and having identical components in the other dimensions, 2. algebraic addition means designated by numbers 1, 2 . . . , $m_j$ each having first and second inputs and one output, 3. means for reading out said memory means designated by multi-dimensional addresses each having a serial number $i_j = 0, 1, 2, . . . , m_j$−1 as a component in the $j$ th dimension, and for non-destructively reading out said memory means designated by the multi-dimensional address having number $i_j = m_j$ as the component =80 $j$ th and for selectively supplying the read j92 digits from the memory means designated by multi-dimensional addresses each having a serial number $i_j$ = 0, 1, 2, . . . , $m$−1 as the component in the $j$ th dimension to said first inputs of said algebraic addition means designated by numbers 1, 2, . . . , $m_j$ respectively, and for selectively supplying the read out digits from the memory means designated by multi-dimensional addresses each having a serial number $i_j = 1, 2, . . . , m_j$ as the component in the $j$ th dimension to said second inputs of said algebraic addition means designated by numbers 1, 2, . . . , $m_j$ respectively, and for selectively supplying the output digits from said algebraic addition means designated by numers 1, 2, . . . , $m_j$ to the inputs of said memory means designated by multi-dimensional addresses each having a serial number $i_j = 0, 1, 2, . . . , m_j$−1 as a component in the $j$ th dimension respectively for rewriting therein, 4. means for reading out said memory means designated by multi-dimensional addresses each having a serial number $i_j = 0, 1, 2, . . . , m_j$ as the component in the $j$ th dimension a number of times corresponding to the value of the independent variable $x_j$, and wherein a set of operations in the $j$ th dimension comprises performing said element of operation regarding the $j$ th dimension with respect to every combination of the numerial values of $i_j, i_2, . . . , i_{j-1}$ and at least $i_{j+1} = \mathbf{0}, i_{j+2} = \mathbf{0}, . . . , i_n = 0$, and d. means for executing said set of operations in the $j$ th dimension with respect to every dimension to obtain the value of the function $w$ in the memory means of multi-dimensional address (0, 0, . . . , 0).

29. Apparatus as recited in claim 28, wherein said set of operations in the $j$ th dimension comprises performing said element of operation regarding the $j$ th dimension with respect to every combination of the numerical values of $i_1, i_2, . . . , i_{j-1}$ and only for $i_{j+1} = 0, i_{j+2} = 0, . . . , i_n = 0$, and said executing means executes said set of operations in the $j$ th dimension with respect to every dimension according to the order $j = n, n-1, . . . , 2, 1$ to obtain the value of the function $w$ in the memory means of multi-dimensional address (0, 0, . . . , 0).

30. Apparatus as claimed in claim 28 wherein there are further included complementer means connected in series with each of said second inputs of said algebraic addition means designated by numbers 1, 2, . . . , $m_j$ for any one of said set of operations regarding the $j$ th dimension.

* * * * *